United States Patent Office 3,775,443
Patented Nov. 27, 1973

---

3,775,443
17-ACETYLGONANES AND PROCESS THEREFOR
Reinhardt P. Stein, Audubon, Herchel Smith, Bryn Mawr, and Robert C. Smith, Malvern, Pa., assignors to American Home Products Corporation, New York, N.Y.
No Drawing. Continuation-in-part of application Ser. No. 857,557, Sept. 12, 1969, which is a continuation-in-part of application Ser. No. 748,594, July 30, 1968, both now abandoned. This application Mar. 1, 1972, Ser. No. 230,933
Int. Cl. C07c *169/10*
U.S. Cl. 260—397.4       37 Claims

ABSTRACT OF THE DISCLOSURE

Compounds of the 17-acetylgonane series, and D-homo analogs thereof, preferably substituted at C–13 with polycarbonalkyl, and at C–16 with (lower)alkyl, optionally substituted at C–17 with hydroxy, alkanoyloxy or formyloxy; or optionally unsaturated at $C_{16}$–$C_{17}$ (I) are hormonally-active and valuable intermediates for hormonally-active steroids. Compounds (I) of the gon-4-en-3-one series, substituted at C–16 by alkyl, optionally substituted at C–6 by halogen or methyl and optionally unsaturated at $-C_2$–$C_7$– (Ia) are progestationally and anti-estrogenically active. Compounds (I) of the gona-1,3,5(10)-triene series, substituted at C–16 by alkyl (Ic) are estrogenically and anti-lipemically active.

The 17-acetylgon-16-enes, optionally substituted at $C_{16}$ with (lower)alkyl (Ia) and the 17α-acetylgonan-17β-ol, formates or alkanoates (Ie) are provided by hydrating the corresponding 17-ethynylgon-16-enes (IIa) or 17α-ethynylgonan-17β-ol, formates or alkanoates (IIb). Compounds (IIa) and (IIb) are provided, respectively, by (i) dehydrating or (ii) acylating the corresponding 17α-ethynylgonan-17β-ols. Reaction of (Id) with diazoalkanes provides 16α,17α-azo(lower)alkylene compounds (XI), which on decomposition by heating produce 17-acetyl-16-alkylgon-16-enes (II). Reduction of (II) provides the 17-acetyl-16β-alkyl series (In). Reaction of (Id) with alkyl Grignard reagents provides the 17-acetyl-16α-alkyl series (VIII).

Compounds (Id) of the gon-4-en-3-one series are converted by reduction to hormonally-active, especially progestationally, anti-estrogenically, and anti-androgenically active compounds of the 17-acetylgon-4-en-3-one series, e.g., progesterone. Means are provided to obtain progestationally active compounds of the 16-unsubstituted-gon-4-ene series comprising reducing or cleaving $\Delta^{1,3,4(10)}$. Compounds (Ii) or (Ij) followed by Birch reduction in the A-ring and oxidation. Means also are described for providing the new gon-4-en-3-one compounds of this invention substituted at C–16 by alkyl (Ia) comprising converting an aromatic A-ring to a $\Delta^4$-3-one; introduction of methyl or halogen at $C_6$, introduction or unsaturation at $-C_6$–$C_7$– and introduction of hydroxy and alkanoyloxy at $C_{17}$.

---

This application is a continuation-in-part of copending application Ser. No. 857,557, filed Sept. 12, 1969, now abandoned, which in turn is a continuation-in-part of application Ser. No. 748,594, filed July 30, 1968, now abandoned.

This invention is concerned generally with novel steroid compounds and with processes for preparing and using the same, and with useful intermediates therefor. More particularly, it relates to hormonally-active steroids of the 16-alkyl - 13 - polycarbonalkyl-18-nor-pregn-4-en-3-one series, and 19-nor- and D-homo analogs thereof, and especially to the 17β-acetyl-16-alkyl-13-polycarbonalkylgon-4-en-3-one and gona-1,3,5(10)-triene sub-genera thereof, and to intermediates therefor, particularly steroids of the 17-acetylgon-16-series, and 17-acetylgonan-17β-ol, alkanoate series, to D-homo-analogs thereof, to processes of producing them and to novel and valuable processes using them.

DESCRIPTION OF THE INVENTION

The invention contemplates, in essence, 1st, steroid compounds of Formula I

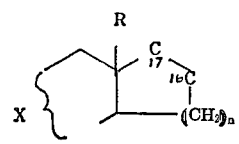

wherein R is polycarbon (lower)alkyl; n is 1 or 2; X is a radical containing at least eleven carbon atoms so arranged as to complete a steroid of the cyclopentanoperhydrophenanthrene series or a D-homo analog thereof; and $-C_{17}$–$C_{16}$– is a divalent radical of the formulae:

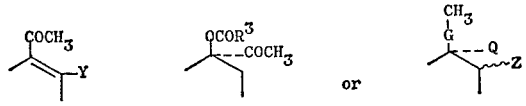

wherein Y is hydrogen or $-CH_2R^4$ wherein $R^4$ is hydrogen or (lower)alkyl; G is C=O or C(H)OR$^1$ wherein $R^1$ is hydrogen or (lower)alkanoyl; Q is H, OH or OCOR$^2$ wherein $R^2$ is lower alkyl; Z is (lower)alkyl, the wavy line ($\zeta$) designating alpha or beta configuration; and $R^3$ is hydrogen or (lower)alkyl, provided that when $$-C_{16}-C_{17}-$$

is

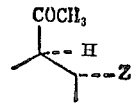

X is other than

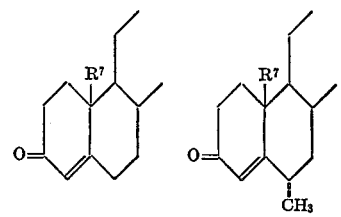

wherein $R^7$ is hydrogen or methyl, and provided that when $-C_{16}-C_{17}-$ is

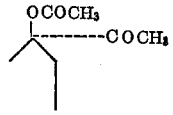

X is other than

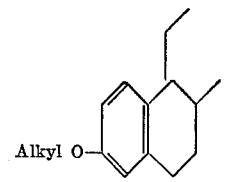

More particularly, a second embodiment is contemplated which are steroid compounds of Formula I wherein X is

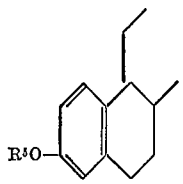

wherein $R^5$ is hydrogen or (lower)alkyl;

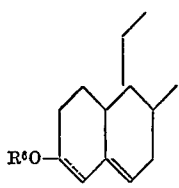

wherein $R^6$ is hydrogen or (lower)alkanoyl; or

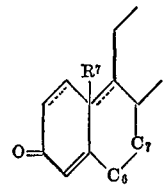

wherein $R^7$ is hydrogen or methyl and $-C_6-C_7$ is a divalent radical of the formulae:

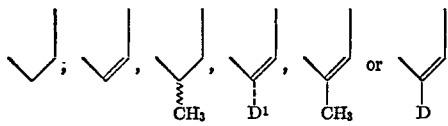

wherein D is chloro, bromo or fluoro and $D^1$ is chloro or bromo, the wavy line (⌇) designating alpha or beta configuration and the broken lines designating single or double bonds provided that when G is C=O, Q is H and Z is alpha, $-C_6-C_7-$ is other than

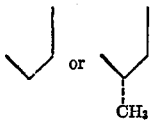

The term "(lower)alkyl" includes hydrocarbon chains of from about 1 to about 6 carbon atoms, both straight chain and branched, illustrative members of which are methyl, ethyl, n-propyl, i-propyl, n-butyl, s-butyl, t-butyl, n-pentyl, isopentyl, hexyl and the like. The term "polycarbon alkyl" contemplates polycarbon(lower)alkyl, containing from about 2 to about 6 carbon atoms and includes groups illustrated above but excluding the methyl group; the ethyl group is preferred. The term "(lower)alkanoyl" contemplates groups of the formula (lower)alkyl—CO—, wherein "(lower)alkyl" is above defined, and the formyl group.

With reference to compounds of Formula I, acetyl is a preferred (lower)alkanoyl group. The term "D-homo" refers to a steroid structure wherein the D-ring comprises 6 carbon atoms (i.e., $a$ is 2) in contrast to the "normal series" of steroid compounds wherein, the D-ring comprises 5 carbon atoms ($a$ is 1). The term "(lower)alkoxy" includes straight and branched chain groups of from about 1 to about 6 carbon atoms, such as methoxy, ethoxy, n-propoxy, i-propoxy, n-hexoxy and the like.

Special mention is made of a number of valuable embodiments of the instant invention. These are: 3rd, an embodiment of the second, which are compounds of Formula Ia:

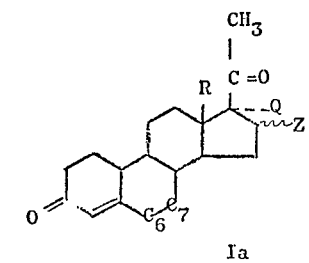

wherein R is polycarbon(lower)alkyl of from about 2 to about 6 carbon atoms; Q is H, OH or $OCOR^2$ wherein $R^2$ is lower alkyl; Z is (lower)alkyl; and $-C_6-C_7-$ is a divalent radical of the formulae:

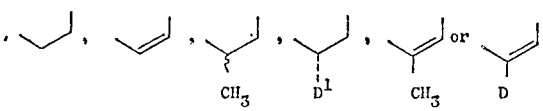

wherein D is chloro, bromo or fluoro and $D^1$ is chloro or bromo, the wavy lines (⌇) designating alpha or beta configuration, provided that when Q is H and Z is alpha, $-C_6-C_7-$ is other than

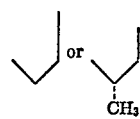

Special mention is made of a number of valuable embodiments embraced by Formula Ia. These are:

4th, 17β-acetyl-13-ethyl-16β-methylgon-4-en-3-one;
5th, 17β-acetyl-6α,16β-dimethyl-13-ethylgon-4-en-3-one;
6th, 17β-acetyl-13-ethyl-17α-hydroxy-16α-methylgon-4-en-3-one;
7th, 17β-acetyl-13-ethyl-17α-hydroxy-16β-methylgon-4-en-3-one;
8th, 17β-acetyl-13-ethyl-17α-hydroxy-16α-methylgon-4-en-3-one, acetate;
9th, 17β-acetyl-13-ethyl-17α-hydroxy-16β-methylgon-4-en-3-one, acetate;
10th, 17β-acetyl-17α-acetoxy-13-ethyl-16α-methylgona-4,6-dien-3-one;
11th, 17β-acetyl-17α-acetoxy-13-ethyl-16β-methylgona-4,6-dien-3-one;
12th, 17β-acetyl-17α-acetoxy-6-chloro-13-ethyl-16α-methylgona-4,6-dien-3-one; and
13th, 17β-acetyl-17α-acetoxy-6-chloro-13-ethyl-16β-methylgona-4,6-dien-3-one.

Also illustrative of valuable compounds embraced by Formula Ia are:

17β-acetyl-13-ethyl-6β-16α-dimethylgon-4-en-3-one;
17β-acetyl-13-ethyl-6β,16β-dimethylgon-4-en-3-one;
17β-acetyl-6α-chloro-13-ethyl-16α-methylgon-4-en-3-one;
17β-acetyl-6α-chloro-13-ethyl-16β-methylgon-4-en-3-one;
and the like.

Illustrative of valuable compounds provided by the processes of the instant invention are 17β-acetyl-13-ethyl-16α-methylgon-4-en-3-one and 17β-acetyl-6α,16α-dimethyl-13-ethylgon-4-en-3-one.

The compounds of Formula I herein are valuable hormonally-active substances and intermediates for hormonally-active substances. Compounds of Formula Ia have been found to be active in standard pharmacological tests in laboratory animals, such as mice, rats, rabbits and the like, progestationally and anti-estrogenically. They are more active then many known compounds now used with these activities and, in addition, possess a valuable separation of hormonal properties to a greater degree than compounds presently used with these activities. Particularly valuable are compounds of the 4th through 13th embodiments. Progestationally-active substances are used in cases of infertility and more specifically, but without limitation, to delay estrus and ovulation in cattle, pigs and dogs. Anti-estrogenically-active compounds are administered to counter the effects due to an excess of estrogen, such as estrone and similar metrotropic agents. The instant compounds are also of value in that field of use known as microdose contraception. They have an anti-fertility effect at considerably lower levels of administration than the levels used conventionally, e.g., 1 mg. to 100 mg., on a daily basis.

This invention also contemplates as a 14th embodiment steroid compounds of Formula Ib:

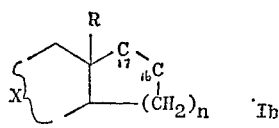

wherein R is polycarbon(lower)alkyl; n is 1 or 2, $-C_{17}-C_{16}-$ is a divalent radical of the formulae:

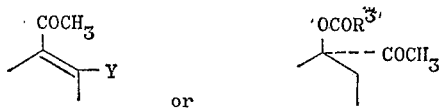

wherein Y is hydrogen or $-CH_2R^4$ wherein $R^4$ is hydrogen or (lower)alkyl; and $R^3$ is hydrogen or (lower)alkyl; and X is

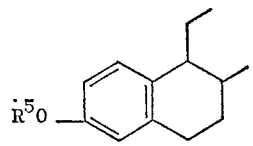

wherein $R^5$ is hydrogen or (lower)alkyl;

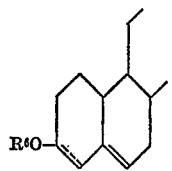

wherein $R^6$ is hydrogen or (lower)alkanoyl; or

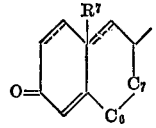

wherein $R^7$ is hydrogen or methyl and $-C_6-C_7$ is a divalent radical of the formulae:

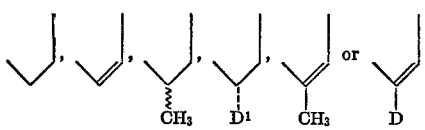

wherein D is chloro, bromo or fluoro and $D^1$ is chloro or bromo, the wavy lines ⸰ designating alpha or beta configuration and the broken lines designating single or double bonds.

Special mention is made of a number of valuable embodiments within the scope of Formula Ib: These are:

15th, 17 - acetyl-13-ethyl-3-methoxygona-1,3,5(10),16-tetraene;

16th, 17α-acetyl - 13 - ethyl-3-methoxygona-1,3,5(10)-trien-17β-ol, formate;

17th, 17-acetyl-13-ethylgona-4,16-dien-3-one;

18th, 17-acetyl-13-ethyl-3-methoxy-16-methylgona-1,3,5(10),16-tetraene;

19th, 17 - acetyl - 13-ethylgona-5,16-dien-3β-ol, acetate and its free 3β-ol; and 20th, 17-acetyl - 13 - ethyl - 16 - methylgona-5,16-dien-3β-ol, acetate and its free 3β-ol.

Also contemplated as embodiments of the second are the

21st, 17β - acetyl - 13 - ethyl-16β-methylgon-5-en-3β-ol, acetate;

22nd, 17β - acetyl - 13 - ethyl-16α-methylgon-5-ene-3β, 17α-diol;

23rd, 17β - acetyl - 13 - ethyl-16α-methylgona-3,5-diene-3,17α-diol;

24th, 13 - ethyl - 17β - (1-hydroxyethyl)-16α-methyl-3-methoxygona-1,3,5(10)-trien-17α-ol; and 25th, 13 - ethyl - 17β - (1-hydroxyethyl)-17α-hydroxy-16α-methylgon-4-en-3-one.

This invention also contemplates as a 26th embodiment, compounds of Formula Ic:

Insert 855 A

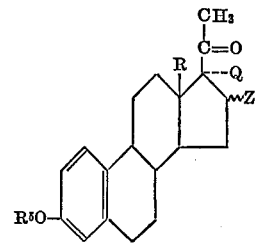

wherein R is polycarbon (lower)alkyl; Q is H, OH or $OCOR^2$ wherein $R^2$ is lower alkyl; Z is (lower)alkyl; and $R^5$ is hydrogen or (lower)alkyl, the wavy line (⸰) designating alpha or beta configuration.

Special mention is made of a number of valuable embodiments within the scope of Formula Ic. These are:

27th, 17β - acetyl - 13-ethyl-16-methyl-3-methoxygona-1,3,5(10)-trien or the 16α-epimer thereof;

28th, 17β - acetyl - 13 - ethyl - 16α - methyl-3-methoxygona-1,3,5(10)-trien-17α-ol; and 29th, 17β - acetyl - 13 - ethyl - 16β - methyl-3-methoxygona-1,3,5(10)-trien-17α-ol.

The compounds of Formulae Ib and Ic herein are valuable hormonally-active substances. They have been found to be active in standard pharmacological tests in laboratory animals such as mice, rats and the like, estrogenically and anti-lipemically. Particularly valuable are the compounds of the 15th through 23rd and the 27th through 29th embodiments. Estrogenically active substances are used to treat the symptoms of estrogen deficiencies, such as to induce heat in anestrus. Anti-lipemically active compounds are administered to curb a tendency to develop atherosclerosis. In addition, and as will be demonstrated hereinafter, compounds of Formula I are especially valuable as intermediates in the synthesis of hormonally active steroids, such as progesterone, and in particular, other compounds having progestational and anti-estrogenic activity.

In another broad aspect, the present invention contemplates, as a 30th embodiment; a process for the preparation of a compound of the 17-acetylgon-16-ene series or a D-homo analog thereof, which comprises heating a solution of the corresponding 17-ethynylgon-16-ene or D-homo analog thereof in the presence of water and a catalyst until hydration of the 17-ethynyl group is substantially complete, and recovering said acetyl compound. This aspect can be depicted as follows:

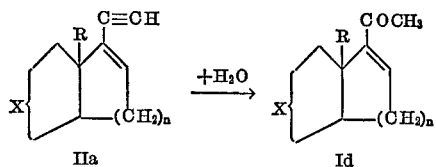

wherein R is (lower)alkyl and X and n are as above defined. The compound of Formula IIa can be dissolved or suspended in a mixture of a (lower)alkanol, such as ethanol or methanol, and water, then a hydration promoter or catalyst, e.g., a mercurated cation exchange resin, is added and the reaction mixture can be heated above about 50° C. and preferably to refluxing until hydration is substantially complete, e.g., from about 1 to about 24 hours— usually 5 hours is adequate. The product (Id) is recovered, for example, by filtering the reaction mixture and adding enough water to cause complete separation of the product. If desired it can be purified by recrystallization from a (lower)alkanol. Alternately, the catalyst can be a heavy metal ion salt, derived from, for example, silver, mercury and the like and in this case refluxing aqueous dioxane or tetrahydrofuran solvent systems are very useful.

As variants of this 30th embodiment there are mentioned: a 31st embodiment, wherein the catalyst in said process is a mercurated cation exchange resin, generally of the sulfonated, cross-linked polystyrene type described, for example, in U.S. Pat. 2,366,007, or an obvious chemical equivalent thereof, of about a 200–400 mesh-size, preferably one which has first been treated with a strong mineral acid, such as sulfuric acid or hydrochloric acid, for conversion to the hydrogen ion form, and then activated by treatment with a soluble mercuric salt, such as mercuric acetate, or an obvious chemical equivalent thereof, until formation of the mercurated cation exchange resin was complete;

A 32nd embodiment, which is the process of the 30th embodiment including the step of preparing said 17-ethynylgon-16-ene or D-homo analog thereof by dehydrating a corresponding 17α - ethynylgonan-17α-ol or D-homo analog thereof. This aspect can be depicted as follows:

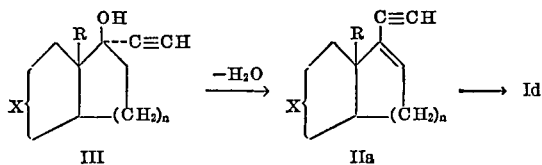

wherein R is (lower)alkyl and X and n are as above defined. Dehydration if III can be carried out conveniently by heating in a solvent in the presence of a water-removal agent. In one manner of proceeding, III is added to a cold, e.g., 0° C., mixture of pyridine and excess phosphorus oxychloride. The reaction is promoted by heating to about 90–100° C.; usually about 30 minutes is adequate. IIa is recovered, for example, by pouring the reaction mixture into water or aqueous acid and separating the solid. IIa can be purified, if desired, by recrystallization from a (lower)alkanol, e.g., methanol or isopropanol;

A 33rd embodiment, which is the process of the 32nd embodiment wherein the dehydration is accomplished by treatment with phosphorus oxychloride in pyridine or an obvious equivalent thereof;

A 34th embodiment, which is a process for the preparation of a compound of the 17α-acetyl gonan-17β-ol, formate or (lower)alkanoate (particularly acetate) series or a D-homo analog thereof which comprises heating an alcoholic solution of the corresponding 17α - ethyynyl-gonan-17β-ol, formate or alkanoate, or D-homo analog thereof in the presence of water and a catalyst until hydration of the 17α-ethynyl group is substantially complete, and recovering said compound; this aspect can be depicted as follows:

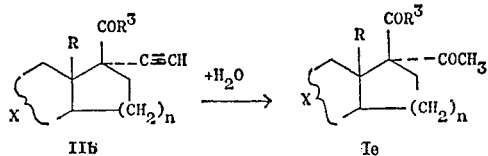

wherein R is (lower)alkyl and R³, X and n are as above defined; the hydration of IIb to Ie is carried out generally by the same procedure outlined above to hydrate IIa to Id. Ie can be purified by the techniques described for Ia and it can also be purified by chromatography, for example, in benzene on a column of fluorosilicate;

A 35th embodiment which is the process of the 34th embodiment wherein the catalyst is a mercurated cation exchange resin of the type described in the 31st embodiment;

A 36th embodiment which is the process of the 34th wherein said catalyst is silver nitrate; and A 37th embodiment which is the process of the 34th embodiment including the step of preparing said 17α-ethynylgonan-17β-ol, formate, or D-homo analog thereof, by reacting the corresponding 17α-ethynylgonan-17β-ol, or D-homo analog thereof with dimethylformamide in the presence of phosphorous oxychloride; this aspect can be depicted as follows:

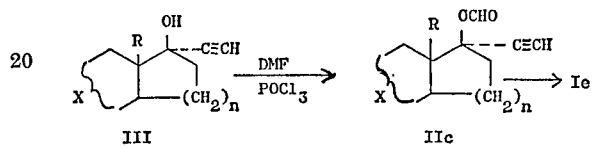

wherein R is (lower)alkyl and X and n are as above defined and "DMF" is dimethylformamide. The formylation of III occurs smoothly in a mixture of dimethylformamide and phosphorus oxychloride. The dimethyl formamide is cooled to about 0–5° C. and about ⅙ volume of POCl₃ is added, then compound III. After only a short time, about 3 minutes, formylation is complete and the product IIc is recovered, for example, by pouring the reaction mixture into a cold solution of pyridine and water which causes it to precipitate. IIc can be purified if desired by recrystallization from a lower alkanol, such as isopropanol. The corresponding (lower)alkanoates, i.e., R³ is (lower)alkyl are prepared by reaction of III with the corresponding alkanoyl halide or anhydride in a solvent such as ethyl acetate with catalytic pyridine.

Also contemplated by this invention is a 38th embodiment which is a process for the preparation of a compound of the 17β-acetylgonane series, or a D-homo analog thereof, which comprises:

(a) Reducing a compound of the 17-acetylgon-16-ene series of a D-homo analog thereof; or (b) Reductively cleaving a compound of the 17α-acetylgonan-17β-ol, formate or alkanoate series or a D-homo analog thereof (Ie), provided that Ie does not contain a conjugated ketone or other art-recognized moiety subject to side reactions, until formation of said 17β-acetylgonane or D-homo analog is substantially complete, and recovering said reduced compound. This embodiment provides one means to obtain the valuable hormonally active steroids using the instant compounds of Formula I as intermediates. It can be depicted as follows:

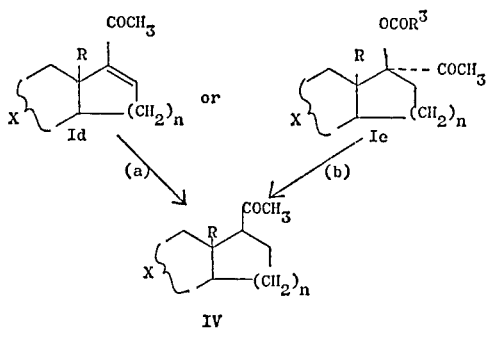

wherein R is (lower)alkyl and R³, X and n are as hereinabove defined. To carry out step (a) a mixture of a catalyst, such as 5 or 10% palladium on carbon and ethanol is pretreated with hydrogen; a solution of Id in a solvent such as ethyl acetate is added and hydrogen is admitted until the uptake is complete. IV is recovered by filtering of the catalyst and evaporating off the solvent. The residue (IV) can be purified by recrystallization, e.g., from acetone, hexane or mixtures thereof. To carry out (b), Ie is cleaved with an alkali metal, e.g., potassium, sodium or lithium (or an alkaline earth metal, e.g., calcium, in a liquid amine, e.g., ammonia. A solution of Ie in a solvent such as dioxane, tetrahydrofuran, ether and the like, can be added to a solution of calcium in liquid ammonia. After reaction is complete, about 1 hour, the mixture is quenched, e.g., with $NH_4Cl$ and the product is thrown down by adding water. It can be purified by recrystallization, as above.

As variants there are contemplated: a 39th embodiment which is the process of the 38th wherein, in alternative (a), the reduction is carried out with hydrogen in the presence of a catalyst, preferably a noble metal catalyst, such as a platinum or a palladium catalyst, or with an alkali metal, such as sodium or lithium, or an alkaline earth metal, such as calcium, in a liquid amine, such as ammonia and preferably in the presence of an alkanol, such as t-butyl alcohol, and, in alternative (b) the reductive cleavage is carried out with an alkali metal, such as sodium or lithium, or an alkaline earth metal, such as calcium, in a liquid amine, such as ammonia and preferably in the presence of an alkanol, such as t-butyl alcohol;

A 40th embodiment which is the process of the 38th wherein the very valuable hormone progesterone is prepared by reducing 17-acetyl-10,13-dimethylgon-4,16-dien-3-one; this can be depicted as follows:

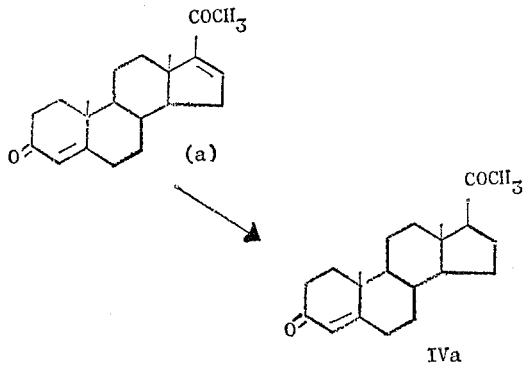

wherein Compound IVa is progesterone, a compound of established and recognized utility in the treatment of functional uterine bleeding, amenorrhea, premenstrual tension, dysmenhorrhea, habitual abortion, menopausal syndrome and infertility. Regimens for IVa are established and dosages are a matter of common knowledge and experience (Merck Index, 7th ed., p. 856);

A 41st embodiment is a process as defined in the 38th above wherein 17β - acetyl-13-ethyl-3-methoxygona-1,3,5(10)-triene is prepared by (a) reducing 17-acetyl-13-ethyl-2-methoxygona-1,3,5(10),16-tetraene or (b) cleaving 17α - acetyl-13-ethyl-3-methoxygona-1,3,5(10)trien-17β-ol, formate or acetate; this can be depicted as follows:

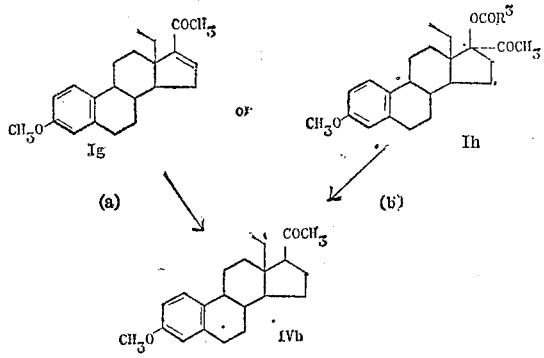

wherein $R^3$ is hydrogen or methyl and wherein compound IVb is 17β - acetyl-13-ethyl-3-methoxygona-1,3,5(10)-triene;

A 42nd embodiment of this invention is a process for the preparation of a compound of the 17β-acetylgon-4-en-3-one series, or a D-homo analog thereof, which comprises:

(a)(i) Reducing the corresponding 17 - acetyl-3-alkoxygona-1,3,5(10), 16-tetraene or (ii) cleaving and reducing the corresponding 17α - acetyl-3-alkoxygona-1,3,5(10)-trien-17β-ol, formate or alkanoate, until formation of the corresponding 17β - (α-hydroxyethyl)-3-alkoxygona-2,5(10)-diene is substantially complete;

(b) Hydrolyzing said gona-2,5-(10)-diene from step (a) with acid until formation of the corresponding 17β-(α-hydroxyethyl)gon-4-en-3-one is substantially complete; and (c) Oxidizing said gon-4-en-3-one from step (b) until formation of said 17β-acetylgon-4-en-3-one is substantially complete. This can be depicted as follows:

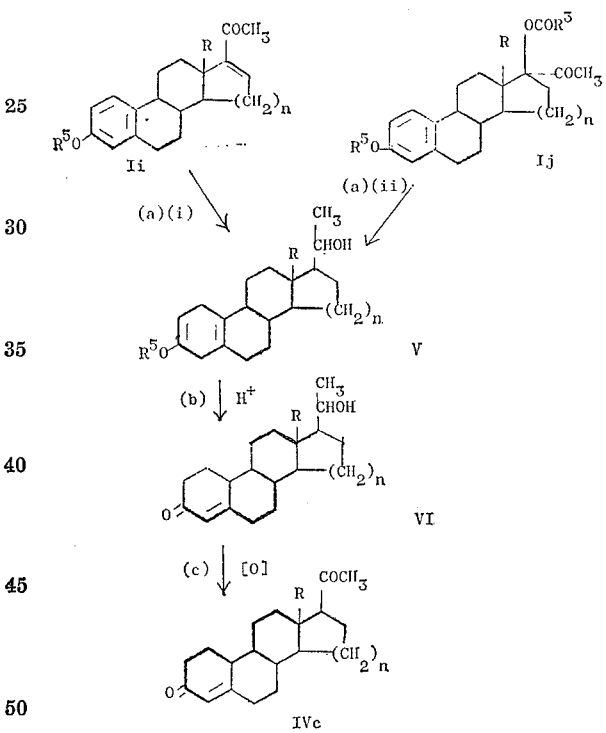

wherein R is (lower)alkyl, preferably polycarbon (lower) alkyl and $R^5$ is (lower)alkyl and $R^3$ and n are as hereinabove defined. In one manner of proceeding, Ii or Ij in a solvent such as dioxane can be added to a solution of lithium in distilled liquid ammonia and then the mixture is stirred for about an hour. t-Butanol is added, the mixture is stirred a further hour, more lithium is added and the mixture is stirred a final hour. V can be recovered by adding methanol to discharge the blue color and not water to boil off the ammonia. V can be converted to VI by dissolving in boiling alcohol, e.g., methanol containing mineral acid, e.g., hydrochloric acid and boiling for about an hour. VI is recovered by adding excess water, extracting, e.g., with ether and evaporating the solvent. VI is converted to IVc by Jones oxidation, e.g., by solution in acetone, adding sodium sulfate and then 8 N chromic acid. After about ½ hour, water is added to precipitate IVc and it is purified by chromatography in benzene over neutral alumina and by recrystallization, e.g., from acetone, hexane or mixtures thereof;

A 43rd embodiment is the process as defined under the 42nd above wherein step (a)(i) or (ii), is carried out in the presence of excess lithium in liquid ammonia and t-butanol; step (b) is carried out in methanol and hydrochloric acid; and the oxidation in step (c) is carried out with 8 N chromic acid in anhydrous acetone;

A 44th embodiment is the process as defined under the 42nd above wherein 17β-acetyl-13-ethylgon-4-en-3-one is prepared by (a)(i) Reducing 17 - acetyl - 13-ethyl-3-methoxygon-1,3,5(10),16-tetraene or (ii) cleaving and reducing 17α-acetyl - 13 - ethyl - 3 - methoxygona-1,3,5(10)-triene-17β-ol, formate or acetate to form 17β-(α-hydroxyethyl)-13-ethyl-3-methoxygona-2,5(10)-diene:

(b) Hydrolyzing the product of step (a) to provide 17β-(α-hydroxyethyl) - 13 - ethylgon-4-en-3-one; and (c) Oxidizing the product of step (b) to provide said 17β-acetyl-13-ethylgon-4-en-3-one.

This valuable embodiment is depicted by the pathway under the 41st above wherein R is ethyl and $n$ is 1. The product, 17β - acetyl - 13-ethylgon-4-en-3-one, is an important, known progestational agent.

The valuable product of the 44th embodiment is also provided by the 45th embodiment which is a process as defined under the 38th above wherein 17β-acetyl-13-ethylgon-4-en-3-one is prepared by reducing 17-acetyl-13-ethylgona-4,16-dien-3-one; this selective reduction can be accomplished, for example, by hydrogenation in the presence of a catalyst, preferably a noble metal catalyst, e.g., 5% palladium on charcoal, and can be depicted in the following way:

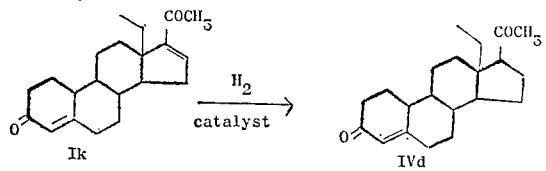

The valuable objectives of this invention are achieved also with the 46th embodiment which is a process as defined under the 30th above including the steps of reacting said 17-acetylgon-16-ene with a reagent of the formula (lower)alkyl·Mg·hal wherein hal is bromo, iodo or chloro and (lower)alkyl is as above defined and preferably methyl, until formation of the corresponding 17-acetyl-16α-(lower)alkyl-gonane enolate is substantially complete, reacting said enolate with acid and recovering said gonane; this can be depicted as follows:

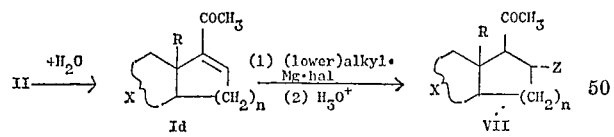

wherein R is (lower)alkyl and X, Z, $n$ and "hal" are as above defined. A 3 M ethereal solution of Grignard reagent, e.g., methyl magnesium iodide, can be diluted with 5 volumes of solvent, e.g., diethyl ether and a promotor, cuprous chloride, can be added. Then a suspension of Id in ether is added and the mixture is refluxed until formation of the Grignard complex is complete—about 2 hours. The mixture is cooled and quenched with NH₄Cl, filtered washed and dried. Evaporation of the solvents leaves VII as a residue, which can be purified by chromatography in benzene on neutral alumina or by recrystallization from a lower alkanol, e.g., ethanol.

The 47th embodiment which is a process as defined under the 46th wherein 17-acetyl-13-ethylgona-4,16-dien-3-one is reacted with excess methyl magnesium iodide then treated with acid to provide 17β-acetyl-13-ethyl-5β,16α-dimethylgon-3-one; this can be depicted as follows:

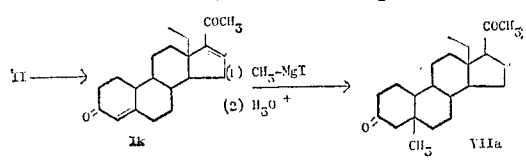

The product of this embodiment, 17β-acetyl-13-ethyl-5β,16α-dimethylgon-3-one (VIIa) is hormonally active as an anti-androgenic agent with anti-estrogenic activity;

The 48th embodiment which is a process as defined under the 46th above wherein 17-acetyl-13-ethyl-3-methoxygona-1,3,5(10),16-tetraene is reacted with methyl magnesium iodide to provide 17β-acetyl-13-ethyl-6α-methyl-3-methoxygona-1,3,5(10)-triene. This embodiment can be depicted as follows:

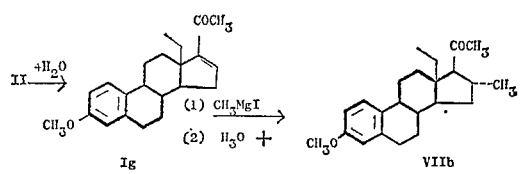

A 49th embodiment which is a process as defined in 46, above including the steps of reducing a 17-acetyl-3-alkoxy-16α-(lower)alkylgon-1,3,5(10)-triene until formation of the corresponding 17β-(α-hydroxyethyl)-3-alkoxy-16α-(lower)alkylgona-2,5(10)-diene is substantially complete;

(b) Hydrolyzing the product from step (a) with acid until formation of the corresponding 17β-(α-hydroxyethyl)-16α-(lower)alkylgon-4-en-3-one is substantially complete; and (c) Oxidizing the product from step (b) until formation of a 17β-acetyl-16α-(lower)alkylgon-4-en-3-one is substantially complete; this can be depicted as follows:

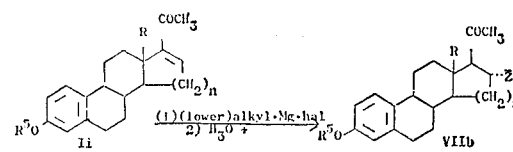

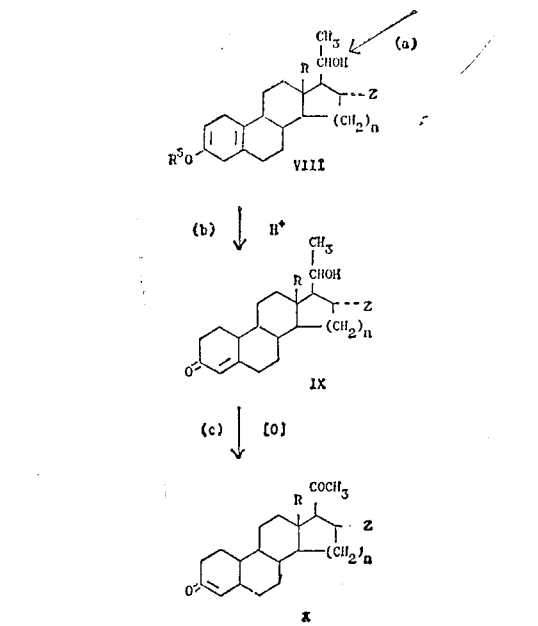

wherein R is (lower)alkyl, preferably polycarbon(lower)alkyl and R⁵ is hydrogen or (lower)alkyl, Z is (lower)alkyl and $n$ is 1 or 2; the general procedure to go from Ij to IVc outlined above is also useful to proceed from VIIb to X; and a 50th embodiment which is the process of the 49th wherein 17β-acetyl-13-ethyl-16α-methylgon-4-en-3-one is prepared by:

(a) Reducing 17β-acetyl-13-ethyl-16α-methyl - 3 - methoxygona-1,3,5(10)-triene to form 17β-(α-hydroxyethyl)-13-ethyl-5-methoxy-16α-methylgona-2,5(10)-diene;

(b) Treating the product of step (a) with an acid to provide 17β-(α-hydroxyethyl)-13-ethyl-16α-methylgon-4-en-3-one; and (c) Oxidizing the product of step (a) with an acid to provide acetyl-13-ethyl-16α-methylgon-4-en-3-one; this aspect may be depicted as outlined under the 49th above wherein R is ethyl and n is 1. The product of this embodiment, 17β-acetyl-13-ethyl-16α-methylgon-4-en-3-one has especially valuable progestational properties.

A further aspect of the instant invention is the 51st embodiment, which is a process as defined in the 46th above including the steps of (a) Treating first with an epoxidizing agent and then with a base a 17-(1-lower)alkanoyloxyethylidene)-3-alkoxy-16α-(lower)alkylgona-1,3,5(10)-triene until formation of the corresponding 17β-acetyl-3-alkoxy-16α-(lower)alkylgona-1,3,5(10)-trien-17α-ol is substantially complete;

(b) Reducing the product from step (a) until formation of a 17β-(1-hydroxyethyl)-3-alkoxy-16α-(lower)alkylgona-1,3,5(10)-trien-17α-ol is substantially complete;

(c) Reducing the product of step (b) under Birch conditions, e.g., as by treatment with lithium and liquid ammonia in THF in the presence of 1-methoxy-2-propanol, then with ammonium chloride, until formation of the corresponding 17β-(1-hydroxyethyl)-4-alkoxy-16α-(lower)alkylgona-2,5(10)-dien-17α-ol is substantially complete;

(d) Hydrolyzing the product from step (c) with acid, e.g., hydrochloric acid, until formation of the corresponding 17β-(1-hydroxyethyl)-17α-hydroxy-16α-(lower)alkylgon-4-en-3-one is substantially complete; and (e) Oxidizing, e.g., with acetic anhydride and dimethylsulfoxide, the product of step (d) until formation of a 17β-acetyl-17α-hydroxy-16α-(lower)alkylgon-4-en-3-one is substantially complete.

As aspect of this is the 52nd embodiment, which is the process of the 51st wherein 17β-acetyl-13-ethyl-16α-methylgon-4-en-3-on-17α-ol is prepared by:

(a) Epoxidizing and hydrolyzing 13-ethyl-17(1-acetoxyethylidene) - 16α - methyl-3-methoxygona-1,3,5(10)-triene to form 17β-acetyl-13-ethyl-16α-methyl-3-methoxygona-1,3,5(10)-trien-17α-ol;

(b) Treating the product of step (a) with a reducing agent to form 13-ethyl-17β-(1-hydroxyethyl)-16α-methyl-3-methoxygano-1,3,5-(10)-trien-17α-ol;

(c) Reducing the product from step (b) to form 13-ethyl - 17β-(1-hydroxyethyl)-16α-methyl-3-methoxygona-2,5(10)-dien-17α-ol;

(d) Hydrolyzing the product from step (c) with an acid to form 13-ethyl-17β-(1-hydroxyethyl)-17α-hydroxy-16α-methylgon-4-en-3-one; and (e) Oxidizing the product of step (d) to form 17β-acetyl-13-ethyl-17α-hydroxy-16α-methylgon-4-en-3-one.

Other valuable products are provided by the 53rd embodiment which is a process as defined in the 51st including the steps of (a) Enolalkanoylating the product until formation of the corresponding 17β - acetyl - 16α - (lower)alkylgona-3,5 - diene - 3,17α - diol, di(lower)alkanoate is substantially complete; and (b) Hydrolyzing the product of step (a) until formation of the corresponding 17β-acetyl - 17α - hydroxy-16α-methylgon - 4 - en - 3 - one, (lower)alkanoate is substantially complete.

An aspect of this is the 54th embodiment which is a process as defined in the 53rd wherein 17β-acetyl-13-ethyl-17α - hydroxy-16α-methylgon-4-en-3-one, acetate, is prepared by:

(a) Enolacetylating 17β - acetyl - 13 - ethyl - 17α - hydroxy - 16α - methylgon-4-en-3-one to form 17β-acetyl-13-ethyl - 16α - methylgona - 3,5 - diene - 3,17α - diol, diacetate; and (b) Hydrolyzing the product of step (a) to form 17β- acetyl - 13 - ethyl - 17α - hydroxy - 16α - methylgon-4-en-3-one, acetate.

The aspects of the 51st to 54th embodiments can be depicted as follows:

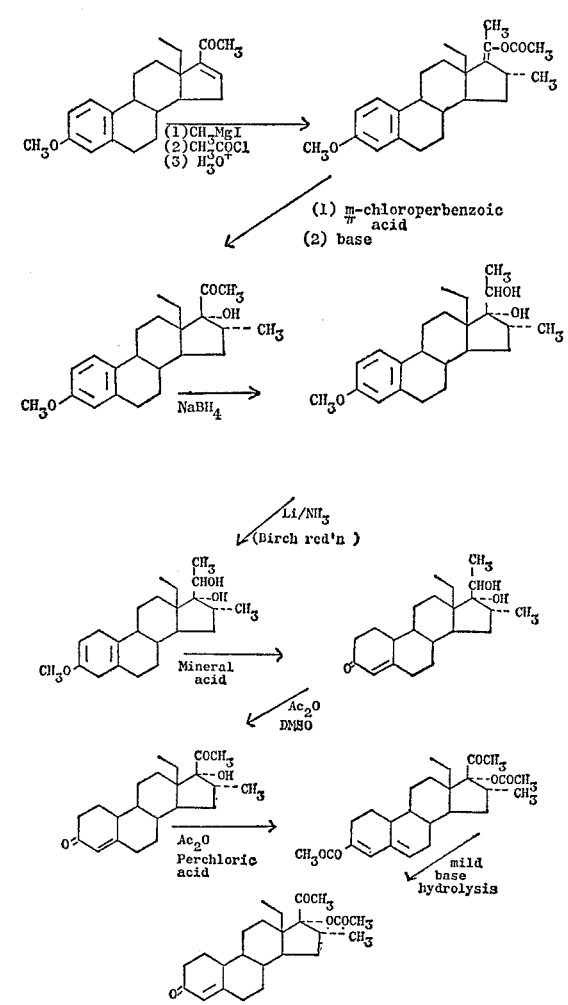

wherein "Ac₂O" is acetic anhydride and "DMSO" is dimethyl sulfoxide. These procedures will be exemplified in detail hereinafter.

A further aspect of the instant invention is the 55th embodiment, which is a process as defined in the 32nd above wherein (a) 13-ethyl - 17α - ethynyl - 3 - methoxy - 16β - methylgona - 1,3,5(10) - trien-17β-ol is dehydrated to produce 13-ethyl - 17 - ethynyl - 3 - methoxy - 16 - methylgona-1,3,5(10),16-tetraene; and including the steps of (b) Heating said ethynyltetraene in solution with water and a catalyst to produce 17-acetyl - 13 - ethyl-3-methoxy-16-methylgona-1,3,5(10),16-tetraene; and (c) Catalytically hydrogenating said acetyltetraene to form 17β-acetyl - 13 - ethyl-3-methoxy-16β-methylgona-1,3,5(10)-triene. The preparation of the substrate used in step (a) is described in detail hereinafter. Reaction conditions useful to accomplish the reactions of steps (a), (b) and (c) are described in the disclosure of the 32nd, 30th and 38th embodiments, respectively, hereinabove.

This aspect can be depicted as follows:

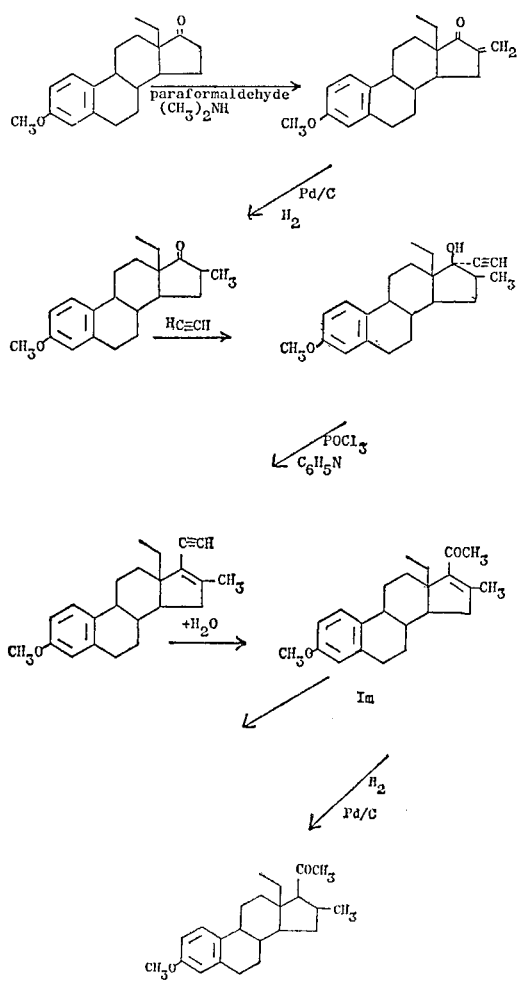

Another valuable aspect of the instant invention is the 56th embodiment, which is a process as defined in the 30th above including the steps of:

(a) Reacting said 17-acetylgon - 16 - ene or D-homo analog thereof with a diazoalkane until formation of the corresponding 17-acetyl - 16α,17α - alkyleneazogonane is substantially complete; and (b) Heating the product of step (a) until rearrangement into the corresponding 17-acetyl-16-alkylgon-16-ene is substantially complete; this embodiment is depicted as follows:

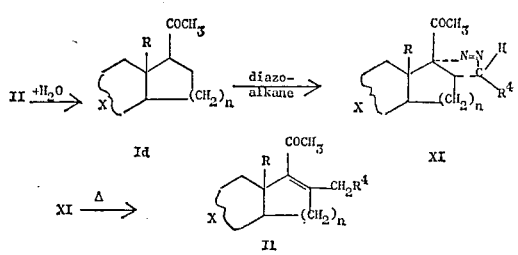

wherein R is (lower)alkyl, X and $n$ are as defined hereinabove, "diazoalkane" is a diazo(lower)alkane compound such as diazomethane or diazoethane or an obvious chemical equivalent thereof, and $R^4$ is hydrogen or (lower)alkyl; Compound Id can be added as an ethereal solution to the diazoalkane, generated in situ by the standard procedures, e.g., by treating N-nitrosomethylurea with base (for diazomethane). The reaction proceeds to completion at moderate temperatures, e.g. 15–40° C. in several hours; even up to 24 hours is entirely satisfactory. XI is recovered by mixing the mixture with water and gently boiling off the ether. The product is filtered off and can be recrystallized from a lower alkanol, e.g., ethanol. Heating XI converts it to II. For example, add XI to diethylene glycol at about 125–200, preferably 185° C. and heat about an hour. Cool, add excess water to throw down II, filter off and, if desired, crystallize II from a (lower) alkanol, e.g., methanol. XI can if desired merely be heated above its melting point (without a solvent) to provide II.

A 57th embodiment is a process as defined under the 56th wherein the diazoalkane in step (a) is diazomethane. This provides the instant compounds of Formula II wherein $R^4$ is hydrogen (e.g., 16-methyl compounds) which, in addition to their valuable estrogenic and anti-lipemic properties, serve as valuable precursors for the entire series of 17β-acetyl-16β-methylgonanes and 17α-oxygenated-17β-acetyl-16β-methylgonanes as will be shown hereinafter; and a 58th embodiment is the process of the 56th wherein (a) 17-acetyl-13-ethyl-3-methoxygona - 1,3,5,(10),16-tetraene is reacted with diazomethane to provide 17β-acetyl-13-ethyl-3-methoxy-16α,17α-methyleneazogona - 1, 3,5(10)triene; and (b) The product of step (a) is heated to provide 17-acetyl-13-ethyl-3-methoxy-16-methylgona - 1,3,5(10),16-tetraene; this can be depicted as follows:

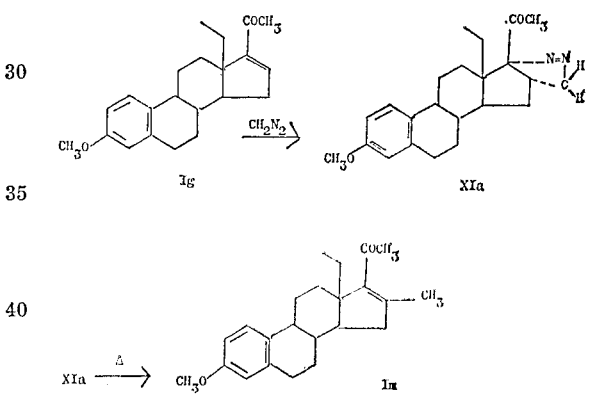

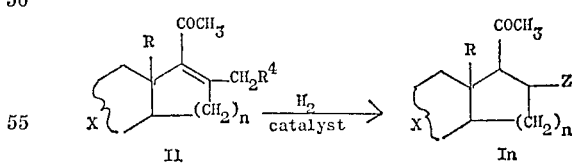

The valuable objects of this invention are also secured by the 59th embodiment which is the process of the 56th including the step of catalytically hydrogenating said 17-acetyl-16-alkylgon-16-ene until formation of the corresponding 17-acetyl-16-alkylgonane is substantially complete. This is represented schematically as follows:

wherein R, $R^4$, X, Z and $n$ are as hereinabove defined. The conditions of hydrogenation and the catalyst can generally be derived from those described in going from Id to IV in the 38th embodiment;

The 60th embodiment which is the process of the 59th wherein 17-acetyl-13-ethyl-3-methoxy-16-methylgona-1,3,5(10),16-tetraene is catalytically hydrogenated to provide 17β-acetyl-13-ethyl-3-methoxy-16β - methylgona - 1,3,5 (10)-triene;

The 61st embodiment which is the process of the 59th including the steps of:

(a) Reducing a 17β-acetyl-16-(lower)alkylgona-1,3,5-(10)-triene until formation of the corresponding 17β-(α-hydroxyethyl)gona-2,5(10)-diene is substantially complete;

(b) Hydrolyzing said gona-2,5(10)-diene from step (a) with acid until formation of the corresponding 17β-(α-hydroxyethyl)-gon-4-en-3-one is substantially complete; and (c) Oxidizing said gon-4-en-3-one from step (b) until formation of a 17β-acetyl-16-(lower)alkylgon-4-en-3-one is substantially completed. This is depicted in the pathway from VIIb to X, above, except that Z will have the beta configuration; and A 62nd embodiment which is the process of the 61st wherein 17β-acetyl-13-ethyl-16β-methylgon-4-en-3-one is prepared by:

(a) Reducing 17β-acetyl-13-ethyl-3 - methoxy - 16β-methylgona-1,3,5(10)-triene to form 17β-(α-hydroxyethyl)-13-ethyl-3-methoxy-16β-methylgona-2,5(10)-diene;

(b) Treating the product of step (a) with acid to form 17β-(α-hydroxyethyl)-13-ethyl-16β-methylgona - 4 - en - 3-one; and (c) Oxidizing the product of step (b) to provide 17β-acetyl-13-ethyl-16β-methylgon-4-en-3-one.

The processes outlined hereinabove provide compounds of Formula I wherein R, $n$, X, Y, Z and $R^3$ are as 1st hereinabove defined, G is C=O or C(H)OR$^1$ wherein $R^1$ is hydrogen and Q is H. To prepare those wherein $R^1$ is (lower)alkanoyl it is merely necessary to react the corresponding 20-ol, e.g., IX, with an alkanoylating agent, such as an alkanoyl halide e.g., acetyl chloride or an anhydride, such as acetic anhydride, in a solvent, such as ethyl acetate in the presence of catalytic pyridine, according to well known procedures.

Introduction of the 17α-substituents and of substituents at $C_6$ and of double bonds at various positions can be accomplished according to one or more of the following pathways:

(a) The 16α-(lower)alkyl compounds are prepared as follows:

wherein R is (lower)alkyl, preferably polycarbon (lower)alkyl, $R^2$, $R^5$ and Z are (lower)alkyl, $n$ is 1 or 2 and $R^8$ is (lower)alkyl. This procedure will be exemplified in detail hereinafter.

Alternatively, as is shown, Ii can be converted to Io in one operation by introducing the 16α-(lower)alkyl group and a 17α-hydroxy function with (lower)alkyl magnesium halide (step Ia) followed by bubbling oxygen gas into the mixture, then the Grignard complex is decomposed. The operation also is especially useful to convert the corresponding 17 - acetyl-13-alkyl-3-(lower)alkoxygona-1,3,5(10),16-tetraene to the instant 17β-acetyl-13-alkyl-16α-(lower)alkyl-3-(lower)alkoxygona - 1,3,5(10)-tetraenes. These procedures will be exemplified in detail hereinafter.

(b) Similarly, the 16β-(lower)alkyl compounds are prepared as follows:

wherein R is (lower)alkyl, preferably polycarbon (lower)alkyl, $R^2$ and Z are (lower)alkyl, $n$ is 1 or 2, $R^5$ is hydrogen or (lower)alkyl and $R^8$ is (lower)alkyl. This procedure will be exemplified in detail hereinafter.

(c) Alternatively, the 16α-(lower)alkyl compounds of Formula Ip can be prepared proceeding through a valuable new intermediate of Formula Ix, as follows:

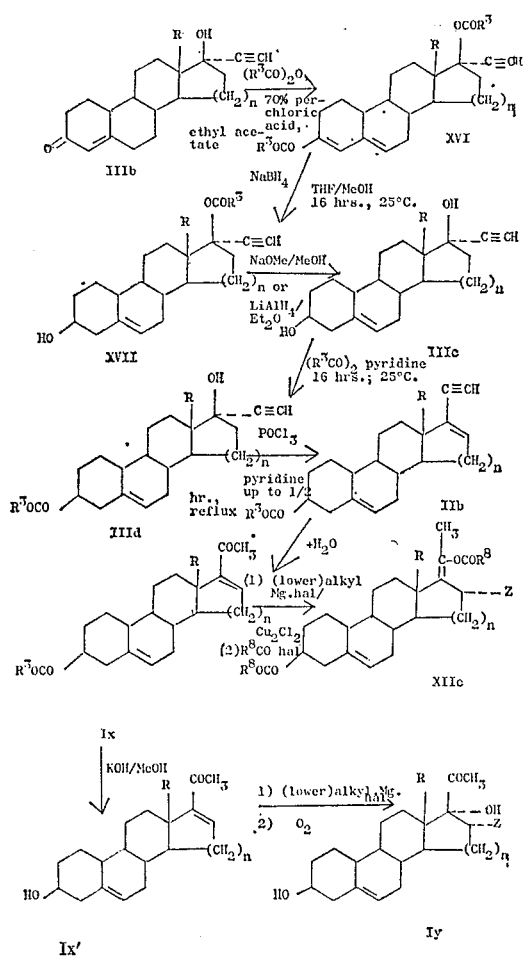

Since some free 3β-ol is formed in the hydration reaction to produce Ix, it is best handled by completing the hydrolysis in a separate operation to obtain Ix'. Alternatively, Ix is converted via XIIc and XIIIb to Iy, as follows:

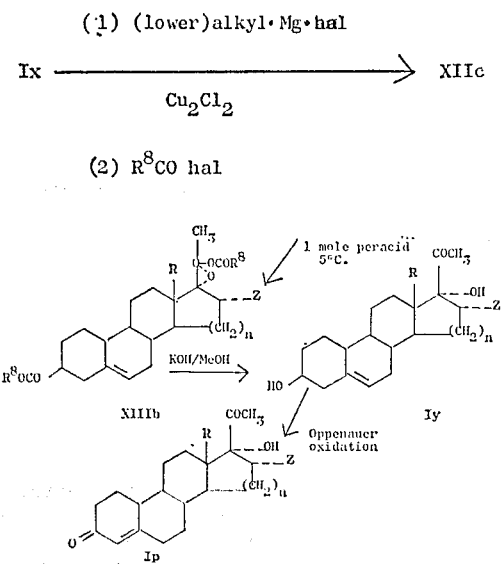

wherein R is (lower)alkyl, preferably polycarbon (lower)alkyl, $R^3$, and $R^8$ and Z are (lower)alkyl and $n$ is 1 or 2.

(d) On the other hand, treatment of the enol acetate XIIc with 2 moles of peracid will lead into the series of 6β-methyl analogs of Ip, namely compounds of Formula Ibb:

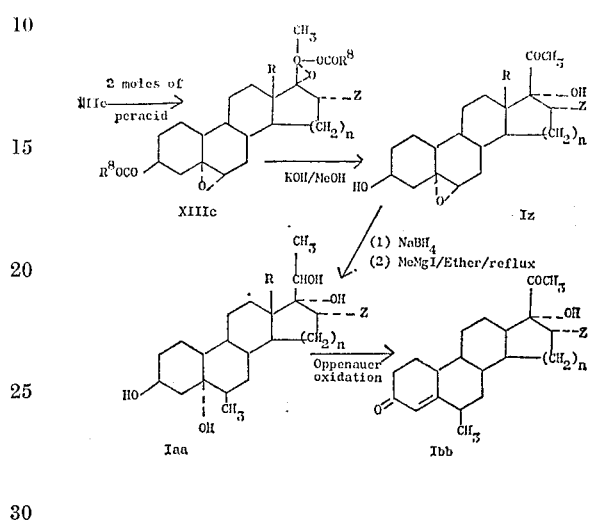

wherein R, $R^8$ and Z are (loweralkyl and $n$ is 1 or 2.

(e) Similarly, the 16β-(lower)alkyl counterparts of Ip and Ibb, namely, compounds of Formulae Iee and Iff are obtained by entirely analogous pathways from the 16β-(lower)alkyl enol ether of Formula XIId which is prepared, for example, from Ix, as follows:

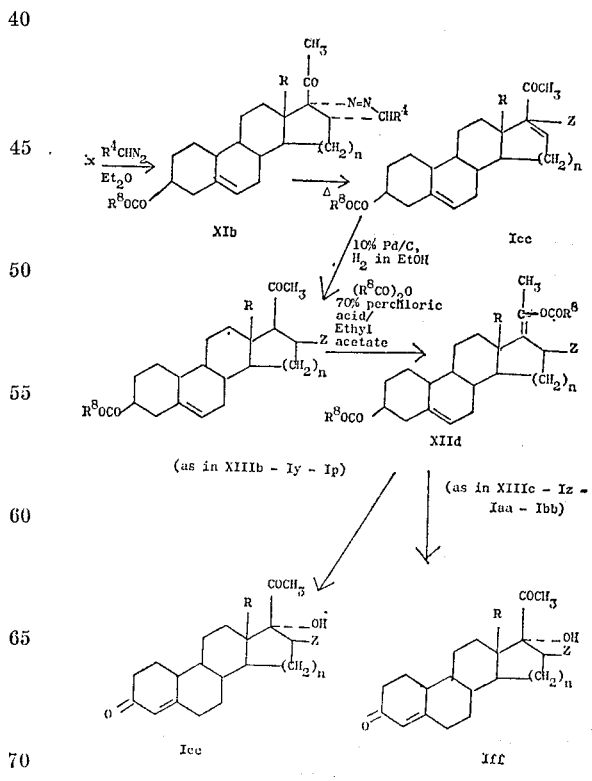

wherein R is (lower)alkyl, preferably polycarbon (lower)alkyl, $R^4$, $R^8$ and Z are (lower)alkyl and $n$ is 1 or 2.

(f) The delta-4,6-dehydro and the 6-chloro, bromo and fluoro analogs within the scope of Formula I are accessible by the following pathway:

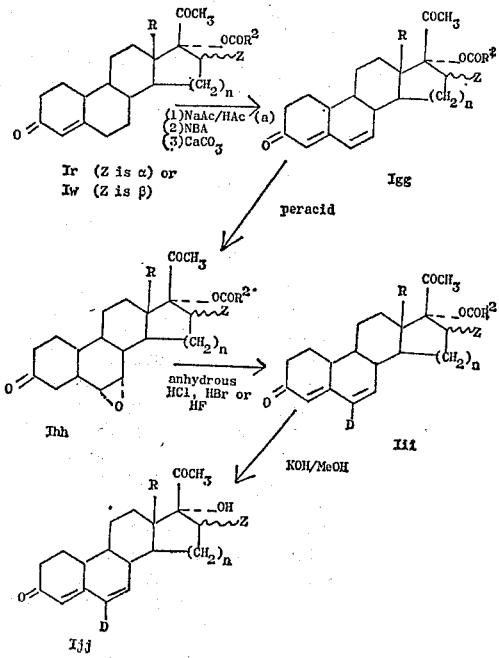

wherein R, R² and Z are (lower)alkyl, D is chloro, bromo or fluoro, n is 1 or 2 and "HBA" is N-bromoacetamide. If the reaction in step (a) is stopped before treating with calcium carbonate and the product is isolated, and if N-chloro-acetamide is substituted for NBA in step A and the products are isolated at that point, there are obtained the corresponding delta-6-dihydro analogs of Formula Ikk:

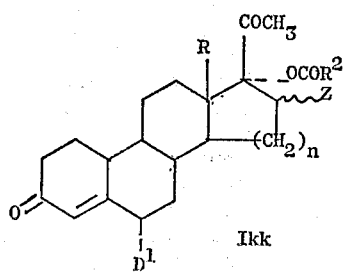

wherein R, R² and Z are (lower)alkyl, n is 1 or 2 and D¹ is bromo or chloro, respectively.

(g) The 6-methyl-4-ones and 6-methyl-4,6-dienes of Formula I are accessible by the following pathway:

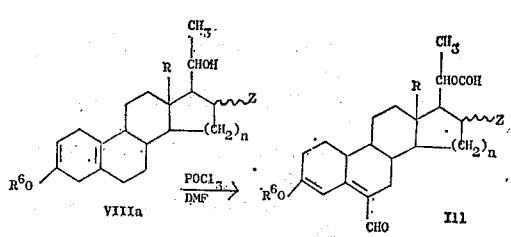

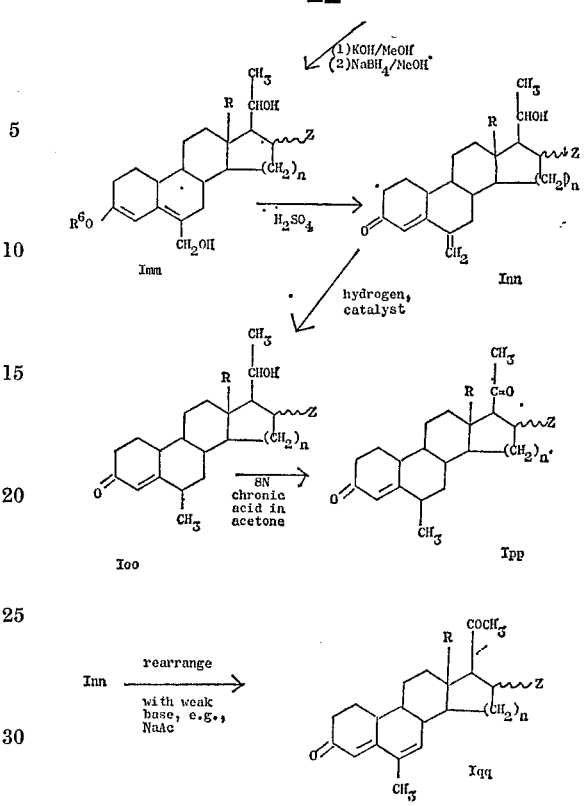

wherein R is (lower)alkyl, preferably polycarbon (lower) alkyl, R⁶ is hydrogen or (lower)alkyl, n is 1 or 2, Z is (lower)alkyl and "DMF" is dimethylformamide.

Introduction of a double bond at $-C_1-C_2-$ is accomplished in standard ways, such as with selenium dioxide dehydrogenation of the corresponding 4-en-3-one. Introduction of a double bond at $-C_9-C_{10}-$ also is accomplished by standard means, such as by treatment of a gona-2,5(10)-diene, e.g., XIIIa with a weak acid, such as oxalic acid or acetic acid to form the corresponding gon-5(10)-ene-3-one, and treating this with about 1 equivalent of bromine in pyridine then pouring the reaction mixture into water. The introduction of a methyl group into the 10-position (R⁷ in Formula I) can be accomplished in known ways, such as by Michael addition of the elements of hydrogen cyanide to gon-5(10)-en-4-ones, then ketalization, reduction to the imine, Wolff-Kishner reduction and acid hydrolysis as described by D. P. Strike, D. Herbst and H. Smith in J. Med. Chem., 10, 446 (1967) or through the Simmons-Smith methylenation of the gon-5(10)en-3β-ol described by R. Rees, D. P. Strike and H. Smith in J. Med. Chem., 10, 783 (1967).

Starting materials for all of the above-mentioned compounds, i.e., those for Formula III:

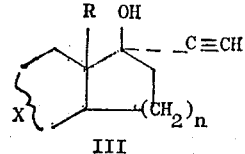

wherein R, X and n are as above defined, are readily available or can be prepared by techniques well known to those skilled in the art. A useful general means comprises reacting a suitably substituted 17-ketogonane, or D-homo analog thereof (after, of course, first protecting other reactive parts of the molecule, if present) with an ethynylating agent, such as a Grignard agent or an alkali metal acetylide. These means are described in detail together with methods for the total synthesis of compounds of Formula III by Douglas, Graves, Hartley, Hughes, McLoughlin, Siddall and Smith in J. Chem. Soc., 1963, 5072–5094; and by H. Smith, Hughes, Douglas, Wendt, Buzby, Jr., Edgren, Fisher, Foell, Gadsby, Hartley, Herbst, Jansen, Ledig, McLoughlin, McMenamin, Pattison, Phillips, Rees, Siddall, Suida, L. Smith, Tokolics, and Watson in J. Chem. Soc., 1964, 4472–4492.

The time and temperature ranges used in carrying out the above mentioned processes are not particularly critical and, as will be readily apparent to those skilled in the art, will be selected to carry out the reaction to a minimum of time without undue difficulty. Thus, reaction temperatures below those exemplified can be used, but then the reaction time is extended. On the other hand, reaction temperatures higher than those exemplified can be used with a concomitant decrease in reaction time, although purity of the product may be somewhat decreased.

In the product of a total synthesis which has not included a suitable resolution stage the compounds of the invention will be present as racemates. Using a convention approved by Fieser and Fieser, "Steroids," p. 336 (1959), the compounds designated as the d-forms are the enantiomers corresponding in configuration at C–13 to that of the natural hormone estrone. The corresponding enantiomorphs are consequently designated the l-forms and the racemates the dl-forms. Racemates will be depicted by structural formulas which show only the enantiomorphs of the d-configuration.

As is mentioned hereinabove, the compounds of Formulae Ib and Ic of this invention have estrogenic and anti-lipemic activity. This makes them useful to treat conditions in animals, such as valuable domestic animals, and in laboratory animals, such as rats, mice and the like, responsive to treatment with estrogenic agents, such as the need to counteract estrogen deficiencies, and to overcome anestrus. In addition they are useful to lower the blood lipid level of animals and can be used wherever antilipemic agents are indicated, such as in the treatment of various hyperlipaemias or where the incidence of atherosclerosis is to be minimized. As is mentioned above, the products of Formula I are also useful as intermediates for the preparation of other steroids, such as progesterone, which have hormonal or other useful activities.

The products of Formula I of this invention can be used in association with a non-toxic carrier. They can be formulated in liquid or solid forms, for instance as capsules, tablets, suppositories, powders, dispensible granules, cachets, and the like by combining them with conventional carriers. Such conventional carriers include magnesium carbonate or stearate, talc, sugar, lactose, pectin, dextrin, starch, gelatin, tragacanth, methyl cellulose, sodium carboxymethyl cellulose, low melting wax and cocoa butter. Diluents, flavoring agents, solubilizers, lubricants, suspending agents, binders or tablet-disintegrating agents can be used. Powders or tablets preferably contain 5 or 10 to 99% of the active constituent. The active steroid can be formulated with an encapsulating material with or without other carriers.

Liquid preparations such as solutions, suspensions or emulsions can also be used. Such preparations include dispersions in a non-toxic carrier such as arachis oil or sterile water, preferably containing a nonionic surface active agent such as fatty acid esters of polyhydroxy compounds, e.g., sorbitan, aqueous starch in sodium carboxymethyl cellulose solutions, aqueous propylene glycol or polyethylene glycol. Thus a water-propylene glycol solution can be used for parenteral injection and aqueous suspensions suitable for oral use can be made by utilizing natural or synthetic gums, resins, methyl cellulose or other well known suspending agents.

The composition can be in unit dose form in which the dose unit is for instance from about 0.1 to about 200 mg. of each active steroid. The unit dose form can be a packaged composition, e.g., packeted powder, vials, or ampules or, for example, in the form of capsules, cachets or tablets or any number of these in packaged form. The pharmaceutical compositions can also consist substantially solely of the active steroid when this is in unit dose form. When used for the purposes stated above, the dosage of the compounds of Formula Ia will vary with the conditions being treated, but in general will be in the range established for progesterone (Merck Index, 7th ed., p. 856 (1960)). Moreover, when used for the purposes stated above, the dosage of the compounds of Formulae Ib and Ic will vary with the conditions being treated, but in general will be in the range established for estradiol (Merck Index, 7th ed., p. 416 (1960)).

As valuable intermediates for compounds of Formula I this invention contemplates compounds of Formulae XIb, XIIa, XIIb, XIIc, XIId, XIIIa, XIIIb, XIIIc, XIVa, XIVb, XVa, XVb, as well as compounds of Formula VIIIb

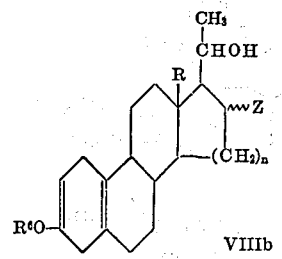

wherein R, $R^6$, Q, Z and n are as above defined and especially 13-ethyl - 17β - (1-hydroxyethyl)-16α-methyl-3-methoxygona-2,5(10) - dien - 17α-ol and also the compound 13-ethyl-17-(1 - acetoxyethylidene)-16α-methyl-3-methoxygona-1,3,5(10)-triene.

DESCRIPTION OF THE PREFERRED EMBODIMENTS

The following examples are given by way of illustration and are not to be construed as limitations of this invention, variations of which are possible without departing from the scope and spirit thereof.

EXAMPLE 1

17-acetyl-13-ethyl-3-methoxygona-1,3,5(10),16-tetraene (a) dl-13-ethyl-17-ethynyl-3-methoxygona - 1,3,5(10), 16-tetraene.—Cool pyridine (200 ml.) in an ice-bath then carefully add phosphorus oxychloride (30 ml.), stir and add dl-13-ethyl-17α-ethynyl - 3 - methoxygona-1,3,5(10)-trien-17β-ol (10.0 g.) and heat the reaction mixture under nitrogen on a steam bath for 30 minutes. Cool the reaction mixture to about 23° C. then below by immersion in an ice-bath. Carefully pour the mixture into ice water. Stir the mixture at room temperature with a little ether to induce crystallization. Blow off the ether ($N_2$) and filter the resulting crystalline solid onto filter aid and air-dry the mixture. Extract the filter aid mixture with methylene chloride and filter. Reduce the methylene chloride to low volume in vacuo, treat the solution with decolorizing charcoal and filter through filter aid. Remove the solevnt in vacuo, dissolve the resulting oil in hot methanol then allow to stand to complete crystallization. Filter to obtain 4.39 g. of the title product; M.P. 117–120° C. Further purify a sample (1.30 g.) by dissolving in methylene chloride, treating with decolorizing charcoal and filtering through filter aid. Remove the solvent in vacuo, dissolve the resulting oil in hot isopropanol, seed and let stand. Filter to obtain 0.96 g. of pure title product; M.P. 126–128° C.;

$\lambda_{max}^{KBr}$ 3.12μ; $\lambda_{max}^{EtOH}$ 226 mμ (ε 15,600)

Analysis.—Calcd. for $C_{22}H_{25}O$ (percent): C, 86.23; H, 8.55. Found (percent): C, 86.11; H, 8.52.

(b) dl-17-acetyl-13-ethyl-3-methoxygona-1,3,5(10),16-tetraene.—Prepared a sulfonated, polystyrene cross-linked cation exchange resin of 200–400 mesh to hydrate the ethynyl group by treating in the following manner: Mechanically stir a mixture of 1 lb. of the resin with a solution of 43 ml. of concentrated sulfuric acid in 1600 ml. of water for 30 minutes. Allow to settle then decant the supernatant liquid from the resin. Wash the resin by treating with water and decanting as above three successive times with 1600 ml. each for 15 minutes each. Activate the resin by stirring for 30 minutes with a solution of mercuric acetate (5 g.) in 1660 ml. of water, decant, then wash four successive times with 1600 ml. of water each time, as above.: The resulting activated resin may be stored under water until use. Among the resins suitable for this purpose is the product known as Amberlite IR–120, marketed by Rohm and Haas, Philadelphia, Pa.

Filter 75 ml. of activated resin (prepared as above) and wash the filter cake with absolute ethanol. Place the resin along with water (10 ml.), absolute ethanol (200 ml.) and $dl$-13-ethyl-17-ethynyl-3-methoxygona-1,3,5(10), 16-tetraene (3.00 g.) in a reaction flask and reflux the mixture for 5 hours. Filter the hot solution through filter aid. Wash the filter cake several times with hot ethanol. Obtain a separate filtrate by further washing the filter cake with methylene chloride. Dilute the ethanol filtrate with water and filter the resulting solid onto filter aid and air-dry the resulting mixture. Extract the filter aid mixture with methylene chloride and combine this filtrate with the methylene chloride filtrate obtained above. Remove the solvent in vacuo to obtain the title product as a yellow crystalline solid. Further purify the solid by dissolving in methylene chloride, treating with decolorizing charcoal and filtering through filter aid. Replace the methylene chloride with absolute ethanol by boiling on the steam-bath, seed and let stand to fully crystallize. Filter the resulting needles to obtain 2.30 g. of title product; M.P. 159–161° C. Obtain an analytical sample by treating 1.22 g. of the solid with decolorizing charcoal in methylene chloride as above to obtain from ethanol 1.02 g. of pure title product; M.P. 160–161.5° C.;

$\lambda_{max.}^{KBr}$ 6.06$\mu$; $\lambda_{max.}^{EtOH}$ 228 m$\mu$ ($\epsilon$ 11,400)

*Analysis.*—Calcd. for $C_{22}H_{28}O_2$ (percent): C, 81.44; H, 8.70. Found (percent): C, 81.40; H, 8.68.

EXAMPLE 2

17$\beta$-acetyl-12-ethyl-3-methoxygona-1,3,5(10)-triene

Pre-treat a mixture of 5% palladium on carbon (300 mg.) and ethyl acetate (25 ml.) with hydrogen at atmospheric pressure. Add a solution of $dl$-17-acetyl-13-ethyl-3-methoxygona-1,3,5(10),16-tetraene (0.80 g.) in ethyl acetate (150 ml.) and continue to react with hydrogen until uptake of the gas is complete. Filter the mixture through filter aid and remove the solvent in vacuo. Crystallize the resulting oil from methanol to get 0.63 g. of the title product; M.P. 123–125° C. Further purify the solid by dissolving it in methylene chloride, treating with decolorizing charcoal and filtering through filter aid. Remove the solvent in vacuo and crystallize the resulting oil from acetone-hexane to obtain 0.45 g. of the pure title product as colorless prisms, M.P. 130–133° C.;

$\lambda_{max.}^{KBr}$ 5.92$\mu$

EXAMPLE 3

17$\beta$-acetyl-13-ethylgon-4-en-one

To a solution of lithium metal (1.00 g.) in distilled liquid ammonia (500 ml.) add a solution of $dl$-17-acetyl-13-ethyl-3-methoxygona-1,3,5(10),16-tetraene (2.00 g.) in dry dioxane (50 ml.) and stir for 1 hour. Add t-butanol (100 ml.) dropwise to the stirred reaction mixture over a period of 1 hour, stir a further hour then add lithium metal (4.0 g.) and stir a final 1 hour. Add methanol dropwise until the blue color is discharged followed by warm water to boil off the ammonia. Filter the white solid onto filter aid, extract the filter cake with ether, filter and evaporate the ether in vacuo. Dissolve the resulting oil in boiling methanol (100 ml.) containing 4 N hydrochloric acid (30 ml.) and continue boiling for 45 minutes. Stir the cooled reaction at room temperature for 2 hours then add water (250 ml.) and extract with ether. Wash, dry and evaporate the extract in vacuo. Dissolve the resulting oil in acetone (100 ml.) containing some anhydrous sodium sulfate then add 8 N chromic acid solution (5 ml.) dropwise and with stirring. Stir for 30 minutes more, then add water (200 ml.) and extract with ether. Wash, dry and evaporate the extract in vacuo. Filter the resulting oil in benzene through a short column of neutral, anhydrous alumina, evaporate the benzene in vacuo and crystallize the resulting colorless oil from acetone-hexane to get 0.69 g. of the pure title product, M.P. 141–143° C.;

$\lambda_{max.}^{KBr}$ 5.90 and 6.02$\mu$; $\lambda_{max.}^{EtOH}$ 238 m$\mu$ ($\epsilon$ 16,800)

EXAMPLE 4

17$\alpha$-acetyl-13-ethyl-3-methoxygona-1,3,5(10)-trien-17$\beta$-ol, formate (a) $dl$-13-ethyl-17$\alpha$-ethynyl-3-methoxygona - 1,3,5(10)-trien-17$\beta$-ol, formate.—Cool dimethylformamide (80 ml.) with an ice-bath, then under nitrogen add phosphorus oxychloride (12 ml.), stir, and add $dl$-13-ethyl-17$\alpha$-ethynyl-3-methoxygona-1,3,5(10)-trien-17$\beta$-ol (4.0 g.). Stir the cooled reaction for 3 minutes then pour it into an ice-cold solution of pyridine (75 ml.) in water (600 ml.). Stir to fully precipitate the product, filter onto filter aid, then extract the filter-cake with methylene chloride. Filter the extract, remove the solvent in vacuo and crystallize the residue from isopropanol to get 3.73 g. of the pure title product, M.P. 143–145° C.;

$\lambda_{max.}^{KBr}$ 3.12, 4.77 and 5.83$\mu$

*Analysis.*—Calcd. for $C_{23}H_{28}O_3$ (percent): C, 78.37; H, 8.01. Found (percent): C, 78.72; H, 7.79.

(b) $dl$-17$\alpha$-acetyl - 13 - ethyl-3-methoxygona-1,3,5(10)-trien-17$\beta$-ol, formate.—Filter mercurated Amberlite IR–120 resin (200 ml. of resin which is activated by the procedure described in Example 1(b)), wash the resin with water and absolute ethanol, then mix it with water (100 ml.) in a reaction flask. Add a suspension of $dl$-13-ethyl-17$\alpha$-ethynyl-3-methoxygona - 1,3,5(10) - trien-17$\beta$-ol, formate (10.0 g.) and absolute ethanol (1.0 l.) and reflux the reaction mixture with stirring for 5 hours. Filter the reaction mixture while hot through filter aid. Wash the filter cake with ethanol then with methylene chloride and evaporate the combined filtrate in vacuo. Dissolve the residue in ether, wash, dry and evaporate the extract, then treat the resulting oil in methylene chloride with decolorizing charcoal, filter and evaporate the solvent in vacuo. Crystallize the residue from absolute ethanol to get 4.85 g. of title product, M.P. 172–176° C. Repeat the above purification by charcoaling to obtain from isopropanol, 3.86 g. of title product, M.P. 179–181° C. Further purify a sample (1.20 g.) by chromatography in benzene on Florex XXS (Floridin Company brand of fluorosilicate), remove the solvent in vacuo and crystallize the residue from absolute ethanol to obtain 1.00 g. of the pure title product as white needles, M.P. 183–185° C.;

$\lambda_{max.}^{KBr}$ 5.87$\mu$

*Analysis.*—Calcd. for $C_{23}H_{30}O_4$ (percent): C, 74.56; H, 8.16. Found (percent): C, 74.33; H, 7.90.

EXAMPLE 5

17$\beta$-acetyl-13-ethyl-3-methoxygona-1,3,5(10)-triene (alternative procedure)

Add a solution of $dl$-17$\alpha$-acetyl-13-ethyl-3-methoxygona-1,3,5(10)-trien-17$\beta$-ol, formate (1.50 g.) in dioxane (50 ml.) to a solution of calcium metal (1.0 g.) in liquid ammonia (400 ml.), stir for 1 hour then quench the reaction mixture with ammonium chloride (5 g.). Add water, filter and dry the resulting white precipitate. Treat the solid in methylene chloride with decolorizing charcoal, filter and remove the solvent in vacuo. Crystallize the residue from acetone-hexane to get 0.72 g. of the title product, M.P. 129–132° C.;

$\lambda_{max.}^{KBr}$ 5.92μ.

When the acetate is substituted for the formate in the above reaction, substantially the same results are obtained.

EXAMPLE 6

17β-acetyl-13-ethylgon-4-en-3-one (alternative procedure)

Add a solution of dl-17α-acetyl-13-ethyl-3-methoxygona-1,3,5(10)-trien-17β-ol, formate (.40 g.) in dioxane (100 ml.) to a solution of lithium metal (2.0 g.) in liquid ammonia (1.0 liter), stir for 1 hour then add t-butyl alcohol (250 ml.) dropwise to the stirred reaction mixture, stir for 1 hour after addition then add a further 8.0 g. of lithium metal and stir 1 hour. Add methanol dropwise until the blue color is discharged. Add water, filter and dry the resulting white precipitate. Treat the solid in methylene chloride with anhydrous sodium sulfate, filter and remove the solvent in vacuo. Cover the resulting solid with methanol (150 ml.) and 4 N hydrochloric acid (50 ml.) and boil the mixture on the steam bath for 30 minutes. Cool, stir at room temperature for 1.5 hours then add water (400 ml.) and extract the mixture with ether. Wash, dry and evaporate the extract in vacuo and dissolve the residue in acetone (150 ml.). Cool the solution in an ice-bath, add anhydrous sodium sulfate (5 g.), then with stirring add 8 N chromic acid solution (10 ml.) dropwise, stir for 15 minutes more, then add isopropanol (20 ml.) and water (500 ml.) and filter the resulting white crystalline precipitate. Treat the solid in methylene chloride with decolorizing charcoal and sodium sulfate, filter and evaporate the solvent in vacuo. Crystallize the oil from acetone-hexane to get 1.15 g. of the title product, M.P. 144–146° C.;

$\lambda_{max.}^{KBr}$ 5.90 and 6.02μ; $\lambda_{max.}^{EtOH}$ 239 mμ (ε 16,900)

Second crops obtained from the above filtrate were 0.65 g., M.P. 140–142° C. When the acetate is substituted for the formate in the above reaction, substantially the same results are obtained.

EXAMPLE 7

17-acetyl-13-ethylgona-4,16-dien-3-one (a) dl-13-ethyl - 17 - ethynylgona - 4,10 - dien-3-one.—Cool pyridine (400 ml.) in an ice-bath, then slowly add phosphorus oxychloride (60 ml.), stir and add dl-13-ethyl - 17α - ethynyl-17β-hydroxygon-4-en-3-one (25 g.). Heat the reaction mixture to mild reflux for 10 minutes, cool (ice-bath) then carefully pour the reaction into a mixture of ice and water and concentrated hydrochloric acid (500 ml.). Add some ether and stir the resulting mixture until most of the solids have broken up and passed into the ether phase. Extract the mixture with ether, then wash and dry the extract. Filter and evaporate the solvent in vacuo and crystallize the resulting oil from methanol to obtain 8.0 g. of the title compound, M.P. 129–132° C. The pure sample from methanol has M.P. 132–135° C.;

$\lambda_{max.}^{KBr}$ 3.12, 4.85 and 6.04μ; $\lambda_{max.}^{EtOH}$ 236 mμ (ε 23,600).

(b) dl-17-acetyl - 13 - ethylgona-4,16-dien-3-one.—Filter 200 ml. of mercurated Dowex 50W–2X resin (a cation exchange resin marketed by Dow Chemical Co., Midland, Mich., activated as described in Example 1(b)), wash the filter cake with water and absolute ethanol. Mix the resin in a reaction flask with water (60 ml.), absolute ethanol (300 ml.) and a solution of dl-13-ethyl-17-ethynylgona-4,16-dien-3-one (8.00 g.) in absolute ethanol (500 ml.) and reflux the mixture with stirring for 5 hours. Filter the hot mixture through filter aid and wash the filter cake with ethanol and methylene chloride. Evaporate the combined filtrates in vacuo, dissolve the residue in methylene chloride, wash, dry and evaporate the solvent in vacuo. Crystallize the residue from benzene-hexane to get 5.00 g. of title product, M.P. 171–174° C. Obtain second crops of 0.45 g., M.P. 172–175° C. Obtain an analytical sample by treating 1.75 g. in methylene chloride with decolorizing charcoal, filtering and replacing the solvent with benzene-hexane to get 1.08 g. of pure title product, M.P. 175–177° C.;

$\lambda_{max.}^{KBr}$ 6.03μ; $\lambda_{max.}^{EtOH}$ 241 mμ (ε 24,600).

Analysis.—Calcd. for $C_{21}H_{28}O_2$ (percent): C, 80.73; H, 9.03. Found (percent): C, 80.84; H, 8.73.

EXAMPLE 8

17β-acetyl-13-ethylgon-4-en-3-one (alternative procedure)

Pre-treat a mixture of 5% palladium on carbon (0.25 g.) and absolute ethanol (50 ml.) with hydrogen at 1 atmosphere. Add a solution of dl-17-acetyl-13-ethylgona-4,16-dien-3-one (1.00 g.) and treat the solution with hydrogen until just slightly over one equivalent amount of the gas is absorbed (ca. 80 ml.). Filter the reaction mixture through filter aid and evaporate the solvent in vacuo to obtain the title product.

EXAMPLE 9

17β-acetyl-13-ethyl-5β-16α-dimethylgon-3-one

Dilute a 3 M ethereal solution of methylmagnesium iodide (10 ml.) with ether (50 ml.), add cuprous chloride (400 mg.), stir then under nitrogen add dropwise a solution of dl-17-acetyl-13-ethylgona-4,16-dien-3-one (1.50 g.) in tetrahydrofuran (25 ml.). Reflux the reaction mixture gently for 1 hour, cool then quench the reaction by the dropwise addition of saturated ammonium chloride solution. Filter, wash and dry the ethereal layer and evaporate the solvent in vacuo. Pass the resulting oil in benzene through a column of anhydrous neutral alumina, evaporate the solvent in vacuo to obtain the title product.

EXAMPLE 10

17β-acetyl-13-ethyl-16α-methylgon-4-en-3-one (a) dl - 17β - acetyl - 13 - ethyl-16α-methyl-3-methoxygona-1,3,5(10)-triene.—Dilute a 3 M ethereal solution of methyl magnesium iodide (10 ml.) under nitrogen with ether (50 ml.), stir and add cuprous chloride (400 mg.). Add a suspension of dl-17-acetyl-13-ethyl-3-methoxygona-1,3,5(10),16-tetraene (1.50 g.) and ether (150 ml.) then reflux the mixture gently for 2 hours. Cool, quench the reaction by the dropwise addition of saturated ammonium chloride solution, filter then wash, dry and evaporate the ethereal layer. Treat the resulting oil in methylene chloride with decolorizing charcoal, filter and evaporate the solvent in vacuo. Crystallize the oil from absolute ethanol to obtain 0.90 g. of title product, M.P. 130–132° C. Further purify a sample (0.80 g.) by passing a benzene solution through a column of anhydrous, neutral alumina, evaporating the solvent in vacuo and crystallizing the residue from absolute ethanol to obtain 0.59 g. of the pure title product, M.P. 137–139° C.;

$\lambda_{max.}^{KBr}$ 5.93μ.

Analysis.—Calcd. for $C_{23}H_{32}O_2$ (percent): C, 81.13; H, 9.47. Found (percent): C, 81.29; H, 9.74.

(b) dl-17β-acetyl-13-ethyl-16α-methylgon - 4 - en - 3-one. — Add a solution of dl-17β-acetyl-13-ethyl-16α-methyl-3-methoxygona-1,3,5(10)-triene (4.5 g.) in dioxane (100 ml.) to a solution of lithium metal (2.0 g.) in liquid ammonia (1 liter) and stir for 1 hr. Add t-butyl alcohol (200 ml.) dropwise over 1 hour, then add more lithium metal (8.0 g.) and stir a further 2 hours. Add methanol dropwise until the blue color is discharged, add water then filter and dry the resulting white precipitate. Add the solid to a mixture of methanol (180 ml.), water (12 ml.) and concentrated hydrochloric acid (10 ml.).

Reflux the mixture for 10 minutes then stir at room temperature for 2 hours. Add water (700 ml.), extract with ether then wash, dry and evaporate the ether in vacuo. Dissolve the resulting oil in acetone (200 ml.) and anhydrous sodium sulfate (5 g.) and cool the mixture with an ice-bath. Add 8 N chromic acid solution (10 ml.) dropwise to the stirred mixture, stir 15 minutes more than add isopropanol (20 ml.) and water (500 ml.) and extract the mixture with ether. Wash, dry and evaporate the extract in vacuo. Pass the resulting oil in benzene through a column of anhydrous neutral alumina, evaporate the solvent in vacuo and recrystallize the residue from absolute ethanol to get 2.70 g. of the pure title product, M.P. 179–181° C.;

$\lambda_{max.}^{KBr}$ 5.93 and 6.03$\mu$; $\lambda_{max.}^{EtOH}$ 239 m$\mu$ ($\epsilon$ 16,000).

*Analysis.*—Calcd. for $C_{22}H_{32}O_2$ (percent): C, 80.44; H, 9.83. Found (percent): C, 80.29; H, 9.78.

EXAMPLE 11

17-acetyl-13-ethyl-3-methoxy-16-methylgona-1,3,5(10)-16-tetraene (a) *dl* - 17$\beta$-acetyl-13-ethyl-3-methoxy-16$\alpha$,17$\alpha$-methyleneazogona-1,3,5(10)triene.—Treat *dl*-17-acetyl-13-ethyl-3-methoxygona-1,3,5(10),16-tetraene (3.00 g.) with an ethereal solution of diazomethane by covering 50% aqueous potassium hydroxide solution (20.0 g. in water) with the substrate in ether (350 ml.), then cooling with an ice-bath and adding N-nitroso methylurea (7.0 g.) in small portions. Stand at room temperature for 3 hours, then add another portion (7.0 g.) of N-nitroso methylurea portionwise at ice-bath temperature and dilute the reaction with another 150 ml. of ether. Allow the solution to stand overnight at room temperature then add the solution to a shallow dish containing water (300 ml.) and gently boil off the ether. Filter the resulting off-white solid to obtain 3.35 g. of title product, M.P. 142–144° C. (decomp.). Treat the sample in methylene chloride with decolorizing charcoal, filter and evaporate the solvent in vacuo. Crystallize the residue from ethanol and let stand to obtain 2.39 g. of title product, M.P. 151–153° C.;

$\lambda_{max.}^{KBr}$ 5.87$\mu$.

Repeat the above purification on 0.35 g. of sample to obtain from ethanol 0.26 g. of pure title product, M.P. 157–159° C. (decomp.).

(b) *dl* - 17-acetyl-13-ethyl-3-methoxy-16-methylgona-1,3,5(10),16-tetraene.—Add *dl*-17$\beta$-acetyl-13-ethyl-3-methoxy-16$\alpha$,17$\alpha$-methyleneazogona-1,3,5(10)-triene (2.00 g.) portionwise to well stirred diethylene glycol (25 ml.) heated to 185° C. (bath) over a period of 25 minutes and continue heating and stirring for a further 10 minutes. Cool, add water and filter the solid onto filter aid. Extract the filter cake with methylene chloride dry, filter and evaporate the solvent in vacuo. Crystallize the residue from ethanol to obtain the title product, M.P. 149–150° C.;

$\lambda_{max.}^{KBr}$ 252$\mu$, ($\epsilon$ 7,300).

EXAMPLE 12

*d*-17$\beta$-acetyl-10,13-dimethylgon-4-en-3-one (progesterone)

(a) *d*-17-ethynyl-10,13-dimethylgona - 4,16 - dien - 3-one. — *d* - 17$\alpha$ - ethynyl-10,13-dimethylgon-4-en-3-one is treated with phosphorus oxychloride by the procedure of Example 7(a) and the product is obtained.

(b) *d*-17-acetyl-10,13-dimethylgona-4,16-dien-3-one.— The product of step (a) is treated with a mercurated cation exchange resin according to the procedure of Example 7(b) and the product is obtained.

(c) *d*-17$\beta$-acetyl-10,13-dimethylgon-4-en-3-one. — The product of step (b) is hydrogenated over 5% palladium on carbon and the product (progesterone) is obtained.

EXAMPLE 13

*d*-17$\alpha$-acetyl-3-methoxyestra-1,3,5(10)-trien-17$\beta$-ol, acetate (a) *d*-17$\alpha$-ethynyl-3-methoxyestra-1,3,5(10)-trien-17$\beta$-ol, acetate.—To a solution of acetic anhydride (130 ml.) and 70% perchloric acid (1.4 ml.) in ethyl acetate (1400 ml.) add *d*-17$\alpha$-ethynyl-3-methoxyestra-1,3,5(10)-trien-17$\beta$-ol (14.0 g.). Swirl the solution and let stand at about 23° C. for 2.5 minutes, then quench the clear solution with saturated sodium bicarbonate solution. Wash the organic layer with sodium bicarbonate solution and with brine, dry over anhydrous sodium sulfate, filter, and remove the solvent in vacuo. Cover the residue with methanol (400 ml.) and pyridine (1 ml.), boil for 10 minutes, cool and evaporate in vacuo. Remove the traces of pyridine and acetic acid by dissolving the residue in toluene, evaporating in vacuo and pumping the residue in vacuo. Dissolve the resulting solid in methylene chloride, treat with decolorizing charcoal, filter and replace the solvent wth absolute ethanol by boiling. Let stand to deposit 15.0 g. of the title product as large white prisms, M.P. 158–160° C.;

$\lambda_{max.}^{KBr}$ 3.12 and 5.76$\mu$.

[$\alpha$]$_D$ +4° (c., 1% in chf.).

(b) *d*-17$\alpha$-acetyl-3-methoxyestra-1,3,5,(10)-trien-17-$\beta$-ol, acetate.—Reflux a mixture of *d*-17$\alpha$-ethynyl-3-methoxyestra-1,3,5(10)-trien-17$\beta$-ol, acetate (4.00 g.) and powdered silver nitrate (400 mg.) in dioxane (200 ml.) and water (40 ml.) for 2¾ hours. Cool and add water (300 ml.) then extract the mixture with ether. Wash the extract with water and brine, dry and evaporate the solvent in vacuo. Triturate the residue with methanol and filter to get 3.00 g. of crude title product, M.P. 146–149° C. Dissolve a sample (2.59 g.) of the solid in benzene and pass the solution through a column of anhydrous neutral alumina. Remove the benzene in vacuo and treat the residue in methylene chloride with decolorizing charcoal, filter and evaporate in vacuo. Replace the solvent with absolute ethanol by boiling, let stand then filter to get 0.67 g. of pure title product, M.P. 162–164° C.;

$\lambda_{max.}^{KBr}$ 5.80 and 5.87

[$\alpha$]$_D$ +52°.

*Analysis.*—Calcd. for $C_{23}H_{30}O_4$ (percent): C, 74.56; H, 8.16. Found (percent): C, 74.49; H, 7.77.

EXAMPLE 14

17$\alpha$-acetyl-13-ethyl-3-methoxygona-1,3,5,(10)-trien-17$\beta$-ol, acetate (a) *dl*-13-ethyl-17$\alpha$-ethynyl-3-methoxygona-1,3,5(10)-trien-17$\beta$-ol, acetate.—To a solution of acetic anhydride (28.8 ml.) and 70% perchloric acid (0.30 ml.) in ethyl acetate (300 ml.) add *dl*-13-ethyl-17$\alpha$-ethynyl-3-methoxygona-1,3,5(10)-trien-17$\beta$-ol (3.00 g.). Swirl the reaction and let stand at about 23° C. for 3.5 minutes then quickly quench the clear solution by adding saturated sodium bicarbonate solution. Wash the organic layer several times with saturated sodium bicarbonate solution, with brine, then dry the extract over anhydrous sodium sulfate. Filter and remove the solvent in vacuo then add methanol (300 ml.) and pyridine (1 ml.) and boil on the steam bath for 10 minutes. Cool and remove the solvent in vacuo. Add toluene and remove it in vacuo several times to remove traces of pyridine and acetic acid, then pump dry. Triturate the residue with methanol and filter to get 3.22 g. of the title product, M.P. 171–173° C. Further purify a sample (1.00 g.) by treating a solution in methylene chloride with decolorizing charcoal, filtering then replacing the solvent with absolute ethanol by boiling on the steam bath. Let stand to crystallize then filter to obtain 0.85 g. of the pure title product, M.P. 175–177° C.;

$\lambda_{max}^{KBr}$ 3.13 and 5.80μ

*Analysis.*—Calcd. for $C_{24}H_{30}O_3$ (percent): C, 78.65; H, 8.25. Found (percent): C, 78.63; H, 8.21.

(b) *dl*-17α - acetyl-13-ethyl-3-methoxygona-1,3,5(10)-trien-17β-ol, acetate.—Reflux a mixture of *dl*-13-ethyl-17α - ethynyl-3-methoxygona-1,3,5(10)-trien-17β-ol, acetate (1.0 g.) and powdered silver nitrate (0.10 g.) in dioxane (50 ml.) and water (10 ml.) for 3 hours. Cool, add water (200 ml.) then extract the mixture with ether. Wash the extract with water and brine, dry over anhydrous sodium sulfate, filter and evaporate the solvent in vacuo. Triturate the residue with cold methanol. Filter the resulting solid to get 0.51 g. of title product, M.P. 141–144° C.;

$\lambda_{max}^{KBr}$ 5.78 and 5.88μ

EXAMPLE 15

*dl*-17β-acetyl-13-ethyl-16β-mehyl-3-methoxygona-1,3,5(10)-triene (a) *dl*-13-ethyl-3-methoxy - 16 - methylenegona-1,3,5(10)-trien-17-one.—Reflux a mixture of *dl*-13-ethyl-3-methoxygona-1,3,5(10)-trien-17-one (40.0 g.), paraformaldehyde (15.0 g.), demethylamine hydrochloride (60.0 g.) and dry dioxane (500 ml.) into a Sohxlet extractor charged with 1/16 inch number 4A molecular sieves for 2 hours. Add another 15.0 g. of paraformaldehyde and continue refluxing for 3 hours. Cool and remove the solvent in vacuo. Digest the residue with a solution of potassium carbonate (120 g.) in water (600 ml.) then extract well with ether-methylene chloride (using enough ether to keep the organic layer less dense than the aqueous layer). Wash, dry and evaporate the extract in vacuo, then crystallize the residue from methanol to obtain 37.0 g. of title product, M.P. 142–145° C. Obtain an analytical sample from absolute ethanol, M.P. 146–148° C.;

$\lambda_{max}^{KBr}$ 5.81 and 6.09μ; $\lambda_{max}^{EtOH}$ 225 mμ (ε 15,200).

*Analysis.*—Calcd. for $C_{21}H_{26}O_2$ (percent): C, 81.25; H, 8.44. Found (percent): C, 81.06; H, 8.36.

(b) *dl* - 13 - ethyl - 3 - methoxy-16β-methylgona-1,3,5(10)-trien-17-one.—Pre-treat a mixture of 5% palladium on carbon (1.0 g.) and absolute ethanol (50 ml.) with hydrogen at one atmosphere then add a solution of *dl*-13-ethyl-3-methoxy-16-methylenegona - 1,3,5(10)-trien-17 - one (3.00 g.) in ethanol-tetrahydrofuran (200 ml.) and continue to treat with hydrogen until uptake of one equivalent of gas is complete. Filter and evaporate the solvent in vacuo. Treat the residue in methylene chloride with decolorizing charcoal, filter and replace the solvent with ethanol by boiling. Let stand to complete crystallization then filter to obtain 2.67 g. of the pure title product, M.P. 146–150° C.;

$\lambda_{max}^{KBr}$ 5.78μ.

(c) *dl*-13-ethyl-17α-ethynyl - 3 - methoxy-16β-methylgona-1,3,5(10)-trien - 17β - ol.—Dissolve *dl*-13-ethyl-3-methoxy-16β-methylgona-1,3,5(10)-trien - 17 - one (10.0 g.) in benzene (100 ml.) and dry dimethylsulfoxide (250 ml.) then bubble purified acetylene gas through the solution for one hour. Add lithium acetylide-ethylene diamine diamine complex (5.0 g.) and stir the solution under acetylene for one hour. Add 5.0 g. more of the reagent complex and stir a further one hour under acetylene. Pour the reaction into ice-water, extract with ether then wash, dry and evaporate the ether in vacuo. Add ether and let stand at 10° C. then filter the dimeric by-product. Evaporate the filtrate in vacuo and pump the resulting oil under high vacuum. Dissolve the oil in a small amount of ether and scratch to induce crystallization. Let stand until crystallization is complete then add heptane and triturate the solid. Filter to obtain 5.6 g. of the title product, M.P. 108–111° C. Obtain an analytical sample from heptane, M.P. 124–127° C.;

$\lambda_{max}^{KBr}$ 2.92 and 3.08μ.

*Analysis.*—Calcd. for $C_{23}H_{30}O_2$ (percent): C, 81.61; H, 8.93. Found (percent): C, 81.47; H, 8.68.

(d) *dl* - 13-ethyl-17-ethynyl-3-methoxy-16-methylgona-1,3,5(10) - 16 - tetraene.—Cool pyridine (90 ml.), add phosphorus oxychloride (20 ml.) followed by *dl*-13-ethyl-17α-ethynyl - 3 - methoxy-16β-methylgona - 1,3,5(10)-trien-17β-ol (4.50 g.) Stir and heat the reaction to reflux and continue boiling for 25 minutes. Cool to below room temperature and carefully pour the reaction into ice water. Extract the mixture with ether then wash, dry and evaporate the ether in vacuo. Pump the residue dry then dissolve in hexane containing a small amount of ether and pass the solution through a short column of fluorosilicate. Remove the solvent in vacuo. Scratch the resulting oil in isopropanol then filter to obtain 0.80 of the title compound, M.P. 126–129° C. Obtain an analytical sample from isopropanol, M.P. 129–131° C.;

$\lambda_{max}^{KBr}$ 3.1 and 4.83μ; $\lambda_{max}^{EtOH}$ 228 mμ (ε 16,600)

*Analysis.*—Calcd. for $C_{23}H_{28}O$ (percent): C, 86.20; H, 8.81. Found (percent): C, 85.85; H, 8.90.

(e) *dl*-17 - acetyl - 13 - ethyl-3-methoxy-16-methylgona-1,3,5(10)-16-tetraene.—Filter 15 ml. of the specially prepared mercurated Dowex 50W–X8 cationic resin (prepared as described in Example 1), wash the resin with water then with absolute ethanol. Reflux a mixture of the above resin, water (5 ml.), absolute ethanol (100 ml.) and *dl*-13-ethyl - 17 - ethynyl-3-methoxy-16-methylgona-1,3,5(10),16-tetraene (0.50 g.) for 5.5 hours. Filter the hot reaction through filter aid and evaporate the filtrate in vacuo. Dissolve the residue in methylene chloride, treat with decolorizing charcoal, filter and remove the solvent in vacuo. Dissolve the resulting oil in hot ethanol and let stand to complete crystallization. Filter to obtain 0.41 g. of the title product, M.P. 148–150° C.;

$\lambda_{max}^{KBr}$ 6.10μ; $\lambda_{max}^{EtOH}$ 252 mμ (ε 7,300)

(f) *dl*-17β-acetyl - 13 - ethyl-16β-methyl-3-methoxygona-1,3,5(10)-triene.—Pretreat a mixture of 10% palladized charcoal (1.3 g.) and absolute ethanol (100 ml.) with hydrogen at one atmosphere. Then add a solution of *dl* - 17 - acetyl-13-ethyl-16-methyl-3 - methoxygona-1,3,5(10),16-tetraene (4.00 g.) in tetrahydrofuran (300 ml.) and absolute ethanol (300 ml.) and continue hydrogenating until uptake of the gas is complete (10–15 minutes). Filter and evaporate the solvents in vacuo. Dissolve the resulting oil in methylene chloride, treat with decolorizing charcoal, filter and remove the solvent in vacuo. Dissolve the resulting 3.24 g. of the title product as a granular white solid, M.P. 110–111° C. Obtain an analytical sample from ethyl acetate-hexane having M.P. 109–111° C.;

$\lambda_{max}^{KBr}$ 5.91μ

*Analysis.*—Calcd. for $C_{23}H_{32}O_2$ (percent): C, 81.13; H, 9.47. Found (percent): C, 80.83; H, 9.11.

EXAMPLE 16

*dl*-17β-acetyl-13-ethyl-16β-methylgon-4-en-3-one

Add a solution of *dl*-17β-acetyl-13-ethyl-16β-methyl-3-methoxygona-1,3,5(10)triene (3.76 g.) in dry dioxane (100 ml.) to a solution of lithium metal (2.0 g.) in purified liquid ammonia (700 ml.) and stir for 1 hour. Add t-butanol (200 ml.) dropwise over ½ hour, stir a further ½ hour then again add lithium metal (8.0 g.). Stir for 2 hours then add methanol dropwise until the blue color is discharged. Add hot water, filter and dry the resulting white precipitated 2,5(10)-diene. Cover the solid with methanol (180 ml.), water (12 ml.) and concentrated hydrochloric acid (35 ml.). Boil the mixture for 10 minutes, cool and stir at room temperature for 1 hour. Extract the mixture with ether. Wash the extract with water, saturated sodium bicarbonate solution, water, brine and then dry over anhydrous sodium sulfate. Filter and evaporate the solvent in vacuo. Dissolve the resulting oil (gon-4-en-3-one-20ξ-ol) in anhydrous acetone (200 ml.), cool with an ice-bath then add anhydrous sodium sulfate (5 g.). To the cooled solution and 8 N chromic acid solution (8 ml.) dropwise and with stirring over ½ hour. Add isopropanol (10 ml.) and water (500 ml.) then extract the mixture with ether. Wash and dry the extract, evaporate the solvent in vacuo to an oil. Crystallize the oil from methanol to get 0.95 g. of the title product, M.P. 132–134° C. Dissolve the solid in methylene chloride, treat with decolorizing charcoal, filter and remove the solvent in vacuo. Crystallize the residue from methanol to obtain 0.30 g. of pure title product, M.P. 135–137° C.;

$\lambda_{max.}^{KBr}$ 5.91 and 6.02$\mu$; $\lambda_{max.}^{EtOH}$ 240 m$\mu$ ($\epsilon$ 15,600)

*Analysis.*—Calcd. for $C_{22}H_{32}O_2$ (percent): C, 80.44; H, 9.83. Found (percent): C, 80.28; H, 9.71.

Obtain combined second crops from the above crystallization of 0.79 g., M.P. 130–132° C.

EXAMPLE 17

*dl*-17$\beta$-acetyl-6$\alpha$,16$\alpha$-dimethyl-13-ethylgon-4-en-3-one

Cool dimethylformamide (80 ml.) with a methanol-ice bath then under nitrogen and with stirring add phosphorus oxychloride (12 ml.) dropwise. Stir for 10 minutes then add *dl* - 13 - ethyl-17$\beta$-(1-hydroxyethyl)-16$\alpha$-methyl-3-methoxygona-2-5(10)-diene (4.75 g.). Stir the cooled reaction under nitrogen for 2 hours. Add a solution of sodium acetate (50.0 g.) in water (200 ml.), stir rapidly for 30 minutes then extract the reaction with methylene chloride. Wash, dry and evaporate the extract in vacuo to get *dl*-13-ethyl-6-formyl-17$\beta$-(1-formyloxyethyl)-16$\alpha$-methyl-3-methoxygona-3,5-diene. Dissolve the material in tetrahydrofuran (20 ml.) and methanol (50 ml.), cool with an ice-bath then add 50% sodium hydroxide solution (7 ml.). Stir the cooled reaction for ½ hour and add water (300 ml.) and extract the mixture with ethyl acetate. Wash and dry the extract and evaporate the solvent in vacuo to get *dl*-13-ethyl-6-formyl-17$\beta$-(1-hydroxyethyl)-16$\alpha$-methyl-3-methoxygona-3,5-diene. Dissolve the material in methanol (100 ml.), cool with an ice-bath then with stirring add sodium borohydride (5.0 g.). Stir for ½ hour then quench with water (250 ml.) and extract the mixture with ether-ethyl acetate. Wash, dry and evaporate the extract in vacuo to obtain *dl*-13-ethyl-6-hydroxymethyl - 17$\beta$-(1-hydroxyethyl)-16$\alpha$-methyl-3-methoxygona-3,5-diene. Dissolve this product in methanol (75 ml.), cool with an ice bath then with stirring add 8 N sulfuric acid solution (10 drops). Stir for ½ hour, then add a further 25 ml. of methanol and 10 drops of 8 N sulfuric acid solution. Stir the cooled reaction a further ½ hour then dilute with water and extract the mixture with ether-ethyl acetate. Wash, dry and evaporate the extract in vacuo to obtain *dl*-13-ethyl-6-methylene-17$\beta$-(1-hydroxy-ethyl)-16$\alpha$-methylgon-4-en - 3' - one. Dissolve the product in cyclohexene (30 ml.) and absolute ethanol (300 ml.) then add 5% palladized charcoal (1.0 g.) and benzyl alcohol (½ ml.). Reflux the mixture for 4 hours, cool and filter then add concentrated hydrochloric acid (½ ml.) to the filtrate. Evaporate the filtrate in vacuo, add water and extract the mixture with ether. Wash, dry and evaporate the extract in vacuo to get *dl*-13-ethyl-17$\beta$-(1-hydroxyethyl)-6$\alpha$,16$\alpha$-dimethylgon-4-en - 3 - one. Dissolve this product in anhydrous acetone (100 ml.), add anhydrous sodium sulfate (5 g.) then cool with an ice-bath. With stirring and 8 N chromic acid solution (10 ml.) dropwise over ½ hour. Stir a further 10 minutes then quench the reaction with isopropanol (25 ml.) and water (500 ml.). Extract the mixture with ether, wash, dry then evaporate the extract in vacuo. Dissolve the resulting oil in benzene and pass the solution through a short column of anhydrous neutral alumina. Evaporate the benzene in vacuo and crystallize the residue from cold methanol to obtain the title product.

EXAMPLE 18

*dl*-17$\beta$-acetyl-6$\alpha$,16$\beta$-dimethyl-13-ethylgon-4-en-3-one

The procedure of Example 17 is repeated, substituting for the *dl*-13-ethyl-17$\beta$-(1-hydroxyethyl)-16$\alpha$-methyl-3-methoxygona-2,5(10-diene and there is obtained, first, *dl*-13 -ethyl - 6 - formyl - 17$\beta$ - (1 - formyloxyethyl)-16$\beta$-methyl-3-methoxygona-3,5-diene; second, *dl*-13-ethyl-6-formyl - 17$\beta$ - (1 - hydroxyethyl) - 16$\beta$-methyl-3-methoxygona - 3,5 - diene; third, *dl*-13-ethyl-6-hydroxymethyl-17$\beta$ - (1 - hydroxyethyl) - 16$\beta$ - methyl-3-methoxygona-3,5 - diene; fourth, *dl* - 13-ethyl-6-methylene-17$\beta$-(1-hydroxyethyl) - 16$\beta$ - methylgon - 4 - en-3-one; fifth, *dl*-13-ethyl - 17$\beta$ - (1 - hydroxyethyl)-6$\alpha$,16$\beta$-dimethylgon-4-en-3-one, and, finally, the title product.

*dl* - 17$\beta$ - acetyl -6,16$\beta$ - dimethyl - 13-ethylgona-4,6-dien-3-one is prepared by refluxing *dl*-13-ethyl-6-methylene - 17$\beta$ - (1 - hydroxyethyl) - 16$\beta$ - methylgon-4-en-3-one (100 mg.), sodium acetate (50 mg.) and Pd/C (5%, 15 mg.) in absolute ethanol (30 ml.) for 1.5 hrs. The mixture is cooled to about 23° C., diluted with ether, filtered through filter aid, washed with aqueous sodium bicarbonate, brine, dried over anhydrous sodium sulfate and stripped in vacuo. The solid residue is recrystallized from ether to give the 4,6-diene product.

EXAMPLE 19

*dl*-17-acetyl-13-ethylgona-5,16-dien-3$\beta$-ol, acetate (a) *dl* - 13 - Ethyl - 17$\alpha$ - ethynylgon-5-one-3$\beta$,17$\beta$-diol, 3-acetate.—Prepare a solution of acetic anhydride (190 ml.) and 70% perchloric acid (7 ml.) in ethyl acetate (2 l.) then add *dl*-13-ethyl-17$\alpha$-ethynyl-17$\beta$-hydroxygon-4-en-3-one (40.0 g.) and swirl to fully dissolve. Let the reaction stand at about 23° C. for 3 minutes then quench the clear solution with saturated sodium bicarbonate solution. Wash the organic layer with saturated sodium bicarbonate solution and brine, dry and evaporate the solvent in vacuo. Dissolve the residue in methanol (300 ml.) and pyridine (1 ml.), boil for 10 minutes, cool and evaporate the solvent in vacuo. Dissolve the residue in toluene and evaporate in vacuo several times to remove acetic acid and pyridine then recrystallize the residue from methanol. Filter to obtain 37.0 g. of *dl*-13-ethyl-17$\alpha$-ethynylgona-3,5-diene-3,17$\beta$-diol, diacetate, M.P. 160–164° C. Dissolve this compound in tetrahydrofuran (300 ml.) and methanol (500 ml.) and cool with an ice bath. With stirring add sodium borohydride (50 g.) in small portions over two hours (keep cool). Stir a further 18 hours at room temperature then add water (1 l.) and extract with ether. Wash, dry and evaporate the extract in vacuo to get *dl*-13-ethyl-17$\alpha$-ethynylgon-5-en-3$\beta$,17$\beta$-diol, 17-acetate. Obtain a pure sample from ethanol, M.P. 146–148° C.;

$\lambda_{max.}^{KBr}$ 3.05, 3.09 and 5.76$\mu$

Cover the above product with methanol (600 ml.), cool with an ice bath then add sodium methoxide (20.0 g.) and stir the cooled reaction for 1 hr. and at about 23° C. a further 2 hr. Add water (1 liter) dropwise, extract the mixture with ether-ethyl acetate then wash, dry and evaporate in vacuo to obtain *dl*-13-ethyl-17$\alpha$-ethynylgon - 5 - en - 3$\beta$,17$\beta$-diol. Obtain a sample from methanol (as a methanol solvate), M.P. 119–121° C. (evolution of solvent). Dissolve all of this produce in pyridine (500 ml.) add acetic anhydride (120 ml.) and allow the reaction to stand at about 23° C. for 16 hrs. Pour the reaction into water and let stand for 1 hour. Extract with ethyl acetate then wash, dry and evaporate the extract in vacuo to an oil. Dissolve the oil in methylene chloride, treat with decolorizing charcoal, filter and evaporate the solvent in vacuo. Dissolve the resulting oil in methanol and let stand to obtain 26.0 g. of the title product (*dl*-13-ethyl - 17$\alpha$ - ethynylgon-5-ene-3$\beta$,17$\beta$-diol, 3-acetate), M.P. 172–174° C.;

$\lambda_{max.}^{KBr}$ 2.96, 3.14 and 5.82$\mu$

*Analysis.*—Calcd. for $C_{23}H_{32}O_3$ (percent): C, 77.49; H, 9.05. Found (percent): C, 77.32; H, 8.66.

(b) *dl*-13-ethyl - 17 - ethynylgona-5,16-dien-3β-ol, acetate.—Cool pyridine (60 ml.) in an ice-bath, add phosphorus oxychloride (9 ml.) dropwise and with stirring then add *dl*-13-ethyl-17α-ethynylgon-5-ene-3β,17β-diol, 3-acetate (3.00 g.) and gently reflux the reaction for 10 minutes. Cool, carefully pour into ice-water and extract the mixture with ether. Wash, dry and evaporate the extract in vacuo and crystallize the residue from methanol to obtain 0.60 g. of the title product, M.P 119–122° C.;

$\lambda_{max.}^{KBr}$ 3.14 and 5.82μ.

(c) *dl*-13-acetyl-13-ethylgona - 5,16 - dien-3β-ol, acetate.—Reflux a mixture of mercurated Dowex 50W–X8 cationic resin (15 ml.) ethanol (100 ml.) and *dl*-13-ethyl-17-ethynylgona-5,16-dien-3β, acetate (0.57 g.), for 4 hours. Filter the hot reaction mixture through filter aid, wash the filter-cake with methylene chloride then evaporate the combined filtrates in vacuo. Scratch the resulting oil with a small amount of ether, triturate the solid with methanol and filter to obtain 100 mg. of the title product, M.P. 127–129° C.;

$\lambda_{max.}^{KBr}$ 5.80 and 6.05μ.

EXAMPLE 20

*di*-17β-Acetyl-13-ethyl-16α-methyl-3-methoxygona-1,3,5(10)-trien-17α-ol (a) *dl*-13-ethyl-17-(1-acetoxyethylidene) - 16α - methyl - 3 - methoxygona-1,3,5(10)-triene.—To dry tetrahydrofuran (250 ml.) and 3 M ethereal methyl magnesium bromide (90 ml.), stir then cool the clear solution with an ice-methanol bath and under nitrogen add cuprous chloride (2.0 g.). Stir cold for 10 minutes then add a solution of *dl* - 17 - acetyl-13-ethyl-3-methoxygona - 1,3,5(10),16-tetraene (25.0 g.) in warm dry tetrahydrofuran (250 ml.), dropwise over 15 minutes to the cooled reaction. Rinse the addition funnel with a further 100 ml. of dry tetrahydrofuran, add this to the reaction then stir cold for 10 minutes and at room temperature for one hour. Cool the reaction again with an ice-methanol bath and with stirring, under nitrogen add a solution of freshly distilled acetyl chloride (25 ml.) in dry tetrahydrofuran (100 ml.) dropwise. Stir cold a further 5 minutes then at room temperature for 20 minutes. Cool the reaction again with an ice-methanol bath and add 10% aqueous ammonium chloride solution (600 ml.) dropwise with stirring. Extract the reaction with ether then wash, dry and evaporate the extract in vacuo. Dissolve the resulting oil in methanol, filter then evaporate the methanol to low volume in vacuo. Let stand to deposit 22.5 g. of the title product, M.P. 108–111° C.

(b) *dl*-17β-acetyl-13-ethyl - 16α - methyl-3-methoxygona-1,3,5(10)-trien-17α-ol.—To a solution of *dl*-13-ethyl-17 - (1-acetoxyethylidene) - 16α - methyl-3-methoxygona-1,3,5(10)-triene (25.0 g.) in ether (600 ml.) and m-chloroperbenzoic acid (30.0 g.) and stir at room temperature for 24 hours. Wash the extract well with 5% aqueous potassium carbonate, with water and brine then dry and evaporate the solvent in vacuo. Dissolve the resulting oil in methanol (350 ml.) and add a solution of potassium carbonate (10.0 g.) in water (50 ml.) then gently boil the mixture for 45 minutes. Cool and dilute the reaction with water then extract with ethyl acetate-ether. Wash, dry and evaporate the extract in vacuo. Triturate the residue with hexane and filter to get 14.0 g. of the crude title product. Obtain a pure sample of the title product by chromatography on fluorosilicate and crystallization from ether then from methanol; M.P. 160–162° C.;

$\lambda_{max.}^{KBr}$ 2.92 and 5.93μ.

*Analysis.*—Calcd. for $C_{23}H_{32}O_3$ (percent): C, 77.49; H, 9.05. Found (percent): C, 77.34; H, 8.70.

EXAMPLE 21

*dl*-17β-acetyl-13-ethyl-16β-methyl-3-methoxygona-1,3,5(10)-trien-17α-ol (a) *dl*-13-ethyl - 17 - (1-acetoxyethylidene)-16β-methyl-3-methoxygona - 1,3,5(10)-triene.—To a solution of acetic anhydride (9.6 ml.) and 70% perchloric acid (0.1 ml.) in ethyl acetate (200 ml.) add *dl*-17β-acetyl-13-ethyl-16β-methyl - 3 - methoxygona-1,3,5(10)-triene (2.00 g.), swirl the mixture and let the reaction stand at about 23° C. for 5 minutes. Quench the clear solution with saturated sodium bicarbonate solution. Wash, dry and evaporate the organic layer than add methanol (200 ml.) and pyridine (1 ml.) and boil for 10 minutes. Cool and evaporate the solvent in vacuo then triturate the residue with cold methanol to obtain the title product.

(b) *dl*-17β-acetyl - 13 - ethyl-16β-methyl-3-methoxygona-1,3,5(10)-trien-17α-ol.—The product of step (a), this example, is converted by the procedure of step (b), Example 20, to the named product.

EXAMPLE 22

*dl*-17β-acetyl-13-ethyl-16β-methyl-3-methoxygona-1,3,5(10)-trien-17α-ol, alternative procedure Treat a solution of *dl*-17β-acetyl-13-ethyl-16β-methyl-3-methoxygona-1,3,5(10)-triene (5.0 g.) and potassium t-butoxide (5.0 g.) in t-butanol (500 ml.) with oxygen at one atmosphere, with shaking until uptake of the gas is complete. Add a solution of glacial acetic acid (50 ml.) in water (150 ml.) and remove the t-butanol by evaporation in vacuo. Add water (300 ml.) and let stand at 0° C. Filter and dry the resulting solid in vacuo. Dissolve the solid in ethanol (70 ml.) and add acid-washed zinc dust (10.0 g.). Stir the reaction for 5 hours at room temperature then filter and wash the filter-cake with ethyl acetate. Dilute the filtrate with water (500 ml.) and extract with ethyl acetate. Wash, dry and evaporate the extract to obtain the title compound.

EXAMPLE 23

*dl*-17β-acetyl-13-ethyl-17α-hydroxy-16α-methylgon-4-en-3-one (a) *dl*-13-ethyl-17β-(1-hydroxyethyl) - 16α - methyl-3-methoxygona-1,3,5(10)-trien-17α-ol.—Stir a mixture of *di*-17β-acetyl-13-ethyl-16α-methyl - 3 - methoxygona-1,3,5(10)-trien-17α-ol (29.5 g.) and methanol (600 ml.) then add sodium borohydride (30.0 g.) in small portions with stirring over 4 hours. Allow the reaction to stand for 17 hours then add water (1500 ml.) dropwise and with stirring to fully precipitate the product. Filter and dry to obtain 26.0 g. of crude title product, M.P. 98–105° C. $\lambda_{max.}$ 2.92μ. Obtain a pure derivative of the title product by dissolving a sample in acetone, adding several drops of 70% perchloric acid and stirring at room temperature for 3 hours. Quench with saturated sodium bicarbonate solution and extract with ether. Wash dry and evaporate the extract in vacuo then dissolve the resulting oil in benzene. Pass the solution through anhydrous, neutral alumina then evaporate the solvent in vacuo to obtain a white solid. Recrystallize the solid from methanol to obtain pure *dl*-13-ethyl-17α,20 - (isopropylidenedioxy) - 3 - methoxy-16α-methyl-18,19-dinorpregna - 1,3,5(10) - triene, M.P. 156–158° C.

*Analysis.*—Calcd. for $C_{26}H_{38}O_3$ (percent): C, 78.35; H, 9.61. Found (percent): C, 78.55; H, 9.86.

(b) *dl*-13-ethyl-17β-(1 - hydroxyethyl) - 16α - methyl-3-methoxygona-2,5(10)-dien - 17α - ol.—To a solution of *dl*-13-ethyl17α-(1 - hydroxyethyl) - 16α - methyl-3-methoxygona-1,3,5(10)-trien-17α-ol (26.0 g.) in dry tetrahydrofuran (600 ml.) add 1-methoxy-2-propanol (400 ml.), stir then add freshly distilled liquid ammonia (2500 ml.). To the stirring reaction add lithium metal (30.0 g.) in small portions at a rate to prevent vigorous refluxing of the ammonia, but fast enough to maintain a blue color. Stir a further 45 minutes after complete addition then add absolute ethanol dropwise to the stirred reaction until the blue color is discharged. Add ammonium chloride (210 g.) in small portions followed by hot water (1500 ml.) in small portions to drive off ammonia and bring the reaction to room temperature. Extract the mixture with ether then wash with water to neutrality. Dry and evaporate the solvent in vacuo. Triturate the residue with hexane and filter to obtain 18.0 g. of the title product, M.P. 164–169° C.

(c) *dl*-13-ethyl-17β-(1 - hydroxyethyl) - 17α - hydroxy-16α - methylgon-4-en-3-one.—Add concentrated hydrochloric acid (6 ml.) and water (6 ml.) to methanol (75 ml.) containing *dl*-13-ethyl-17β-(1-hydroxyethyl) - 16α-methyl-3-methoxygona-2,5(10)-dien - 17α - ol (2.00 g.). Stir the reaction at room temperature for one hour then dilute with water and extract the mixture with ether. Wash, dry and evaporate the extract in vacuo. Triturate the residue with ether-hexane and filter to get 1.54 g. of the title product, M.P. 167–170° C.;

$\lambda_{max.}^{KBr}$ 2.90 and 6.00μ; $\lambda_{max.}^{EtOH}$ 240 mμ (ε 14,500)

(d) *dl*-17β-acetyl - 13 - ethyl-17α-hydroxy-16α-methylgon-4-en-3-one.—Dissolve *dl*-13-ethyl-17β-(1 - hydroxyethyl) - 17α - hydroxy-16α-methylgon-4-3-one (2.93 g.) in dimethylsulfoxide (70 ml.) and dilute with acetic anhydride (15 ml.). Let the reaction stand for 20 hours at room temperature. Pour the reaction into water and extract the mixture with ether-ethyl acetate. Wash, dry and evaporate the extract in vacuo, then pump dry. Dissolve the oil in ether and let stand to crystallize. Filter to obtain 1.00 g. of the title product, M.P. 173–176° C. Obtain an analytical sample by treatment with decolorizing charcoal in methylene chloride solution and recrystallization from methanol to get the pure title product, M.P. 182–184° C.;

$\lambda_{max.}^{KBr}$ 2.93, 5.88 and 6.03μ; $\lambda_{max.}^{EtOH}$ 239 mμ (ε 17,100)

*Analysis.*—Calcd. for $C_{22}H_{32}O_3$ (percent): C, 76.70; H, 9.36. Found (percent): C, 76.98; H, 9.21.

EXAMPLE 24

*dl*-17β-acetyl-13-ethyl-17α-hydroxy-16β-methylgon-4-en-3-one (a) *dl*-13-ethyl-17β-(1 - hydroxyethyl) - 16β-methyl-3-methoxygona-1,2,4(10)-trien-17α-ol.—For the substrate in Example 23, step (a), there is substituted *dl*-17β-acetyl-13-ethyl-16β-methyl - 3 - methoxygona - 1,3,5(10)-trien-17α-ol and the title product is obtained.

(b) *dl*-17β-acetyl-13-ethyl - 17α - hydroxy - 16β -methylgon-4-en-3-one.—For the substrates in Example 23, steps (b)–(d) there are substituted the corresponding products of this example, steps (a)–(c) and the title product is obtained.

EXAMPLE 25

*dl*-17β-acetyl-13-ethyl-17α-hydroxy-16α-methyl-gon-4-en-3-one, acetate and 16β-methyl epimer thereof To a solution of acetic anhyride (4.8 ml.) and 70% perchloric acid (0.05 ml.) in ethyl acetate (75 ml.) add *dl*-17β-acetyl-13-ethyl-17α - hydroxy - 16α - methylgon-4-en-3-one (1.00 g.), swirl and let the reaction stand at about 23° C. for 5 minutes. Quench the clear solution by adding saturated sodium bicarbonate solution. Wash, dry and evaporate the organic extract in vacuo. Add methanol (150 ml.) and pyridine (1 ml.), boil for 5 minutes then cool and evaporate the solvent in vacuo. To the residue add methanol (150 ml.) and sodium carbonate (1.00 g.) then stir about 23° C. for 4 hours. Add water (200 ml.) and extract the mixture with ethyl acetate. Wash, dry and evaporate the extract in vacuo to obtain the title product.

For the above substrate substitute *dl*-17β-acetyl-13-ethyl-17α-hydroxy-16β-methylgon-4-en-3-one to obtain *dl*-17β-acetyl-13-ethyl-17α-hydroxy - 16β-methylgon-4-en-3-one, acetate.

EXAMPLE 26

*dl*-17-acetyl-13-ethyl-16-methylgona-5,16-dien-3β-ol, acetate (a) *dl* - 17β - acetyl - 13 - ethyl - 16α,17α - methyleneazogon - 5 - en-3β-ol, acetate.—Cover 50% sodium hydroxide solution (100 ml.) with a solution of *dl*-17-acetyl-13-ethylgona-5,16-dien-3β-ol, acetate (4.00 g.) in ether (500 ml.). Cool the mixture in an ice-bath, then add N-nitrosomethylurea (12.0 g.) in small portions over 2 hours with swirling. Let the reaction stand overnight at room temperature, then cool the reaction again in an ice-bath and again add N-nitrosomethylurea (12.0 g.) in small portions over 2 hours. Let stand overnight, then separate the ether layer, wash, dry and evaporate the solvent in vacuo to obtain the title product.

(b) *dl*-17-acetyl-13-ethyl - 16 - methylgona - 5,16-dien-3β-ol, acetate.—Heat diethyleneglycol (100 ml.) to 190° C. (bath) then add *dl*-17β-acetyl-13-ethyl-16α,17α-methyleneazogon-5-en-3β-ol, acetate (2.5 g.) portionwise over ½ hr. Continue heating 15 minutes longer then cool and dilute with water (200 ml.). Filter, then treat the solid in methylene chloride with anhydrous sodium sulfate and decolorizing charcoal, filter and evaporate the solvent in vacuo. Crystallize the residue from methanol to obtain the title product.

EXAMPLE 27

*dl*-17β-acetyl-13-ethyl-16β-methylgon-5-en-3β-ol, acetate

Pretreat a mixture of 10% palladized charcoal (1.0 g.) and absolute ethanol (100 ml.) with hydrogen at one atmosphere. Add a solution of *dl*-17-acetyl-13-ethyl-16-methylgona-5,16-dien-3β-ol, acetate (3.00 g.) in absolute ethanol (300 ml.) and continue treating with hydrogen until one mole of the gas is absorbed. Filter and evaporate the solvent in vacuo to obtain the title product.

EXAMPLE 28

*dl*-17β-acetyl-13-ethyl-16α-methylgon-5-en-3β-17α-diol and 16β-methyl epimer thereof (a) *dl*-13-ethyl-(1-acetoxymethylidene) - 16β - methylgon-5-en-3β-ol, acetate.—To a solution of acetic anhydride (48 ml.) and 70% perchloric acid (0.50 ml.) in ethyl acetate (400 ml.) add *dl*-17β-acetyl-13-ethyl-16β-methylgon-5-en-3β-ol, acetate (5.00 g.), swirl the solution then let stand at about 23° C. for 5 minutes. Quench the clear reaction solution with saturated sodium bicarbonate solution, wash and dry the organic layer then evaporate the solvent in vacuo. Add methanol (300 ml.) and pyridine (1 ml.), boil for 10 minutes then cool and evaporate the solvent in vacuo. Triturate the residue with cold methanol to obtain the title product.

(b) *dl*-13-ethyl-17-(1-acetoxyethylidene)-16α-methylgon-5-en-3β-ol, acetate.—Dilute 3 M ethereal methyl magnesium iodide (25 ml.) with dry tetrahydrofuran (40 ml.) then under nitrogen and stirring gently reflux and remove 25 ml. of distillate. Cool, add cuprous chloride (0.40 g.), stir then add a solution of *dl*-17-acetyl-13-ethylgona-5,16-dien-3β-ol, acetate (2.00 g.) in dry tetrahydrofuran (30 ml.) dropwise with stirring. Stir the reaction at room temperature for ½ hour then add a solution of acetyl chloride (10 ml.) in dry tetrahydrofuran (25 ml.) dropwise and with cooling. Stir the reaction a further ½ hour at room temperature then dilute with ether (100 ml.) and saturated ammonium chloride solution (150 ml.). Wash and dry the ether layer and remove the solvent in vacuo. Dissolve the residue in benzene, pass the solution through a column of flurosilicate then evaporate the benzene in vacuo. Crystallize the residue from methanol to obtain the title product.

(c) *dl*-17β-acetyl-13-ethyl-16α-methylgon-5-en-3β,17α-diol.—To an ice cooled solution of *dl*-13-ethyl-17-(1-acetoxy-ethylidene)-16α-methylgon-5-en-3β-ol, acetate (4.20 g.) in ether (300 ml.) add m-chloroperbenzoic acid (3.20 g.) with stirring. Stir the reaction for 4 hours, allowing it to warm to room temperature. Wash the ether layer with 5% potassium carbonate solution, water and with brine, dry and evaporate the extract in vacuo. Dissolve the residue in methanol (200 ml.) cool with an ice-bath then add a solution of potassium hydroxide (3.0 g.) in methanol (50 ml.) and stir for several minutes. Briefly warm the reaction on a steam-bath, cool and continue stirring a further ½ hour at room temperature. Add water (500 ml.) and extract the mixture with ethyl acetate. Wash, dry and evaporate the extract in vacuo to obtain the title product.

For the substrate in step (a) above substitute dl-13-ethyl - 17 - (1 - acetoxyethylidene)-16β-methylgon-5-en-3β-ol, acetate in order to obtain dl-17β-acetyl-13-ethyl-16β-methylgon-5-en-3β,17α-diol.

EXAMPLE 29 dl-17β-acetyl-13-ethyl-17α-hydroxy-16α-methylgon-4-en-3-one and 16β-methyl epimer thereof Reflux a solution of dl-17β-acetyl-13-ethyl-16α-methylgon-5-en-3β,17α-diol (10.0 g.) in methyl ethyl ketone (75 ml.) and benzene (500 mg.) into a water separator for 1 hour. Then add aluminum isopropoxide (8.0 g.) and continue to reflux the reaction for 3 hours. Cool, add water (500 ml.), stir ½ hour then extract the mixture with ether. Wash, dry and evaporate the extract in vacuo to get the title product. Similarly, in the above reaction substitute for the substrate dl-17β-acetyl-13-ethyl-16β-methylgon-5-en-3β,17α-diol to get dl-17β-acetyl-13-ethyl-17α-hydroxy-16β-methylgon-4-en-3-one.

EXAMPLE 30 dl-17β-acetyl-13-ethyl-17α-hydroxy-16α-methylgon-4-en-3-one, acetate (a) dl-17β-acetyl-13-ethyl-16α-methylgona-3,5-diene-3,17α-diol, diacetate.—Prepare a fresh solution of acetic anhydride (9.6 ml.) and 70% perchloric acid (5 drops) in ethyl acetate (100 ml.) then add dl-17β-acetyl-13-ethyl-17α-hydroxy-16α-methylgon-4-en-3-one (1.00 g.). Swirl the reaction for 3 minutes then quickly quench with saturated sodium bicarbonate solution. Dilute the extract with ether and wash with saturated sodium bicarbonate solution, with brine and dry. Evaporate the solvent in vacuo, dissolve the resulting oil in methanol containing a few drops of pyridine then boil gently for 5 minutes. Cool and remove the solvent in vacuo then pump the residue dry. Scratch the resulting oil with cold methanol and let stand to crystallize. Filter to obtain 0.54 g. of title product, M.P. 131–135° C., and second crops of 0.26 g., M.P. 175–180° C. Combine the solids in methylene chloride, treat with decolorizing charcoal then filter and remove the solvent in vacuo. Crystallize the oil from methanol to get 0.66 g. of the pure title product, M.P. 193–196° C.;

$\lambda_{max}^{KBr}$ 5.68, 5.78 and 5.87μ; $\lambda_{max}^{EtOH}$ 233 mμ (ε 17,800).

Analysis.—Calcd. for $C_{26}H_{36}O_5$ (percent): C, 72.86; H, 8.47. Found (percent): C, 72.91; H, 8.21.

(b) dl-17β-acetyl-13-ethyl-17α-hydroxy-16α-methylgon-4-en-3-one, acetate.—Dissolve dl-17β-acetyl-13-methyl-16α-methylgona-3,5-diene-3,17α-diol, diacetate (1.20 g.) in tetrahydrofuran (20 ml.), dilute with methanol (20 ml.) then cool with an ice-methanol bath. Stir and add 2% methanolic sodium hydroxide solution. Continue stirring the cool reaction for 50 minutes then add water (300 ml.) and extract the mixture with ethyl acetate-ether. Wash, dry and evaporate the extract in vacuo. Dissolve the residue in benzene and pass the solution through a short column of neutral, anhydrous alumina. Remove the benzene in vacuo then dissolve the resulting oil in methylene chloride, treat with decolorizing charcoal and filter. Remove the methylene chloride in vacuo and crystallize the resulting oil with the aid of isopropanol-hexane. Filter to obtain 0.45 g. of the pure title product as colorless prisms, M.P. 191–193° C.;

$\lambda_{max}^{KBr}$ 5.77, 5.85 and 5.97μ; $\lambda_{max}^{EtOH}$ 238 mμ (ε 17,600).

Analysis.—Calcd. for $C_{24}H_{34}O_4$ (percent): C, 74.57; H, 8.87. Found (percent): C, 74.79; H, 8.67.

For the substrate in the above reaction, substitute dl-17β - acetyl - 13 - ethyl-17α-hydroxy-16β-methylgon-4-en-3-one in order to obtain dl-17β-acetyl-13-ethyl-17α-hydroxy-16β-methylgon-4-en-3-one, acetate.

EXAMPLE 31 dl-17β-acetyl-17α-acetoxy-13-ethyl-16α-methylgona-4,6-dien-3-one and 16β-methyl epimer thereof To a solution of dl-17β-acetyl-13-ethyl-16α-methylgona-3,5-diene-3,17α-diol, diacetate (1.0 g.) in acetone (20 ml.) add a solution of sodium acetate (0.5 g.) and glacial acetic acid (0.5 g.) in water (5 ml.) and acetone (25 ml.). Cool the reaction to 0° C. then add N-bromoacetamide (1.5 g.) and continue stirring at 0° C. for 3 hours. Pour the reaction into brine, extract with ether then wash, dry and evaporate the solvent below room temperature in vacuo to about 10 ml. Add dimethylformamide (30 ml.) and calcium carbonate (1.0 g.) and heat the reaction to reflux allowing the ether to evaporate. Reflux the mixture for 1 hour, cool and filter. Dilute the filtrate with water then extract with ether and wash, dry and evaporate the solvent in vacuo to obtain the title product.

In the above reaction substitute for the substrate, dl-17β-acetyl-13-ethyl-16β-methylgona-3,5-dien - 3,17α-diol, diacetate to obtain dl-17β-acetyl-17α-acetoxy-13-ethyl-16β-methylgona-4,6-dien-3-one.

EXAMPLE 32 dl-17β-acetyl-17α-acetoxy - 6 - chloro-13-ethyl-16α-methylgona-4,6-dien-3-one, the 6-bromo and 6-fluoro analogs, and the 16β-methyl epimer thereof Dissolve dl-17β-acetyl-17α-acetoxy-13-ethyl-16α-methylgona-4,6-dien-3-one (3.0 g.) in ether (300 ml.) then add m-chloroperbenzoic acid (4.0 g.) and stir the reaction at about 23° C. for 20 hours. Wash the ether extract with 5% potassium carbonate solution, water and brine, then dry and evaporate the solvent in vacuo. Dissolve the residue in glacial acetic acid (100 ml.) then bubble in hydrogen chloride gas until the solution is saturated with the gas. Stir the reaction for 16 hours at about 23° C. then add water (50 ml.) and continue stirring for 1 hr. Extract the mixture with ether then wash the extract well with water then with 5% sodium carbonate solution. Dry the extract then evaporate the solvent in vacuo. Dissolve the residue in benzene and pass the solution through a short column of anhydrous, neutral alumina. Evaporate the benzene in vacuo to obtain the title product.

For the substrate in the above reaction substitute dl-17β-acetyl-17α-acetoxy - 13 - ethyl-16β-methylgona-4,6-dien-3-one to obtain dl-17β-acetyl-17α-acetoxy-6-chloro-13-ethyl-16β-methylgona-4,6-dien-3-one.

For hydrogen chloride in the above reaction substitute hydrogen bromide and hydrogen fluoride. There are obtained dl-17β-acetyl-17α-acetoxy-6-bromo-13-ethyl-16α-methyl-gona-4,6-dien-3-one;
dl-17β-acetyl-17α-acetoxy-13-ethyl-6-fluoro-16α-methyl-gona-4,6-dien-3-one;
dl-17β-acetyl-17α-acetoxy-6-bromo-13-ethyl-16β-methyl-gona-4,6-dien-3-one; and
dl-17β-acetyl-17α-acetoxy-13-ethyl-6-fluoro-16β-methyl-gona-4,6-diene-3-one.

EXAMPLE 33

The procedures of Examples 1(a), 7(a) and 19(b) are repeated, substituting for the substrates therein stoichiometrical amounts of the following compounds:

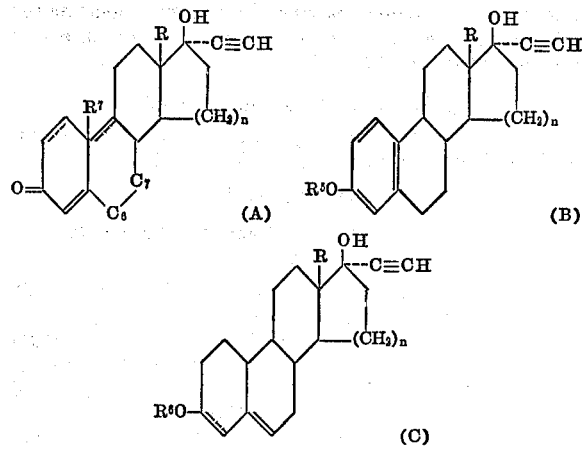

(A)    (B)

(C)

FORMULA (A)

| R | R$^7$— | —C$_6$—C$_7$— | n | Unsaturation |
|---|---|---|---|---|
| CH$_3$CH$_2$ | H |  | 2 | Δ$^4$ |
| CH$_3$CH$_2$ | H | Same | 1 | Δ$^{4,9}$ |
| CH$_3$CH$_2$ | H | ....do...... | 1 | Δ$^{1,4}$ |
| CH$_3$CH$_2$ | H |  | 1 | Δ$^{4,6}$ |
| CH$_3$CH$_2$ | H | (CH$_3$) | 1 | Δ$^4$ |
| CH$_3$CH$_2$ | H | (Br) | 1 | Δ$^4$ |
| CH$_3$CH$_2$ | H | (Cl) | 1 | Δ$^4$ |
| CH$_3$CH$_2$CH$_2$ | H |  | 1 | Δ$^4$ |
| (CH$_3$)$_2$CH | H | Same | 1 | Δ$^4$ |
| CH$_3$(CH$_2$)$_2$CH$_2$ | H | ....do...... | 1 | Δ$^4$ |
| CH$_3$(CH$_2$)$_4$CH$_2$ | H | ....do...... | 1 | Δ$^4$ |

FORMULA (B)

| R | R$^5$ | n |
|---|---|---|
| CH$_3$CH$_2$ | CH$_3$ | 2 |
| CH$_3$CH$_2$ | H | 1 |
| CH$_3$CH$_2$CH$_2$ | CH$_3$ | 1 |
| (CH$_3$)$_2$CH | CH$_3$ | 1 |
| CH$_3$(CH$_2$)$_2$CH$_2$ | CH$_3$ | 1 |
| CH$_3$(CH$_2$)$_4$CH$_2$ | CH$_3$ | 1 |
| CH$_3$CH$_2$ | CH$_3$(CH$_2$)$_4$CH$_2$ | 1 |

FORMULA (C)

| R | R$^6$ | n | Unsaturation |
|---|---|---|---|
| CH$_3$CH$_2$ | CH$_3$CO | 2 | Δ$^5$ |
| CH$_3$CH$_2$ | HCO | 1 | Δ$^5$ |
| CH$_3$CH$_2$CH$_2$ | CH$_3$CO | 1 | Δ$^5$ |
| CH$_3$(CH$_2$)$_2$CH$_2$ | CH$_3$CO | 1 | Δ$^5$ |
| CH$_3$CH$_2$ | CH$_3$(CH$_2$)$_4$CH$_2$CO | 1 | Δ$^5$ |
| CH$_3$CH$_2$ | CH$_3$CO | 1 | Δ$^{3,5}$ |

There are obtained the corresponding 17-ethynylgon-16-enes:

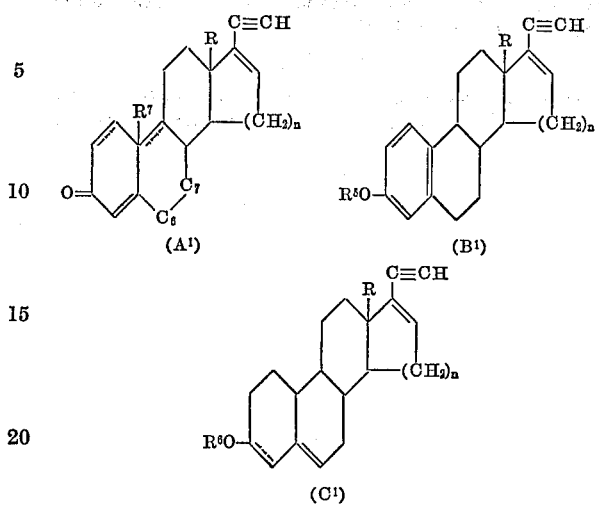

(A$^1$)    (B$^1$)

(C$^1$)

FORMULA (A$^1$)

| R | R$^7$ | —C$_6$—C$_7$— | n | Unsaturation |
|---|---|---|---|---|
| CH$_3$CH$_2$ | H |  | 2 | Δ$^4$ |
| CH$_3$CH$_2$ | H | Same | 1 | Δ$^{4,9}$ |
| CH$_3$CH$_2$ | H | ....do...... | 1 | Δ$^{1,4}$ |
| CH$_3$CH$_2$ | H |  | 1 | Δ$^{4,6}$ |
| CH$_3$CH$_2$ | H | (CH$_3$) | 1 | Δ$^4$ |
| CH$_3$CH$_2$ | H | (Br) | 1 | Δ$^4$ |
| CH$_3$CH$_2$ | H | (Cl) | 1 | Δ$^4$ |
| CH$_3$CH$_2$CH$_2$ | H |  | 1 | Δ$^4$ |
| (CH$_3$)$_2$CH | H | Same | 1 | Δ$^4$ |
| CH$_3$(CH$_2$)$_2$CH$_2$ | H | ....do...... | 1 | Δ$^4$ |
| CH$_3$(CH$_2$)$_4$CH$_2$ | H | ....do...... | 1 | Δ$^4$ |

FORMULA (B$^1$)

| R | R$^5$ | n |
|---|---|---|
| CH$_3$CH$_2$ | CH$_3$ | 2 |
| CH$_3$CH$_2$ | H | 1 |
| CH$_3$CH$_2$CH$_2$ | CH$_3$ | 1 |
| (CH$_3$)$_2$CH | CH$_3$ | 1 |
| CH$_3$(CH$_2$)$_2$CH$_2$ | CH$_3$ | 1 |
| CH$_3$(CH$_2$)$_4$CH$_2$ | CH$_3$ | 1 |
| CH$_3$CH$_2$ | CH$_3$(CH$_2$)$_4$CH$_2$ | 1 |

FORMULA (C$^1$)

| R | R$^6$ | n | Unsaturation |
|---|---|---|---|
| CH$_3$CH$_2$ | CH$_3$CO | 2 | Δ$^5$ |
| CH$_3$CH$_2$ | HCO | 1 | Δ$^5$ |
| CH$_3$CH$_2$CH$_2$ | CH$_3$CO | 1 | Δ$^5$ |
| CH$_3$(CH$_2$)$_4$CH$_2$ | CH$_3$CO | 1 | Δ$^5$ |
| CH$_3$CH$_2$ | CH$_3$(CH$_2$)$_4$CH$_2$CO | 1 | Δ$^5$ |
| CH$_3$CH$_2$ | CH$_3$CO | 1 | Δ$^{3,5}$ |

The procedure of Examples 1, step (b), Example 7, step (b) and Example 19, step (c) are repeated, substituting the 17-ethynylgon-16-enes herein for the substrates therein and there are obtained the following 17-acetylgon-16-enes:

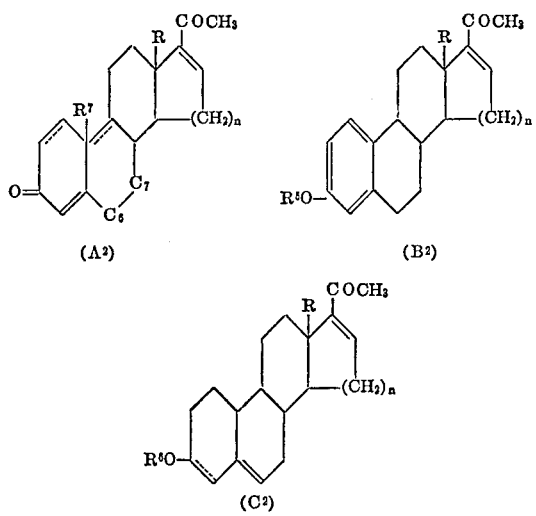

(A²)   (B²)

(C²)

FORMULA (A²)

| R | R⁷ | —C₆—C₇— | n | Unsaturation |
|---|---|---|---|---|
| CH₃CH₂ | H |  | 2 | Δ⁴ |
| CH₃CH₂ | H | Same | 1 | Δ⁴,⁹ |
| CH₃CH₂ | H | ....do...... | 1 | Δ¹,⁴ |
| CH₃CH₂ | H |  | 1 | Δ⁴,⁶ |
| CH₃CH₂ | H |  | 1 | Δ⁴ |
| CH₃CH₂ | H | (CH₃ branch) | 1 | Δ⁴ |
| CH₃CH₂ | H | (Br branch) | 1 | Δ⁴ |
| CH₃CH₂ | H | (Cl branch) | 1 | Δ⁴ |
| CH₃CH₂CH₂ | H |  | 1 | Δ⁴ |
| (CH₃)₂CH | H | Same | 1 | Δ⁴ |
| CH₃(CH₂)₂CH₂ | H | ....do...... | 1 | Δ⁴ |
| CH₃(CH₂)₄CH₂ | H | ....do...... | 1 | Δ⁴ |

FORMULA (B²)

| R | R⁵ | n |
|---|---|---|
| CH₃CH₂ | CH₃ | 2 |
| CH₃CH₂ | H | 1 |
| CH₃CH₂CH₂ | CH₃ | 1 |
| (CH₃)₂CH | CH₃ | 1 |
| CH₃(CH₂)₂CH₂ | CH₃ | 1 |
| CH₃(CH₂)₄CH₂ | CH₃ | 1 |
| CH₃CH₂ | CH₃(CH₂)₄CH₂ | 1 |

FORMULA (C²)

| R | R⁶ | n | Unsaturation |
|---|---|---|---|
| CH₃CH₂ | CH₃CO | 2 | Δ⁵ |
| CH₃CH₂ | HCO | 1 | Δ⁵ |
| CH₃CH₂CH₂ | CH₃CO | 1 | Δ⁵ |
| CH₃(CH₂)₄CH₂ | CH₃CO | 1 | Δ⁵ |
| CH₃CH₂ | CH₃(CH₂)₄CH₂CO | 1 | Δ⁵ |
| CH₃CH₂ | CH₃CO | 1 | Δ³,⁵ |

EXAMPLE 34

The compounds of Formulae A², B² and C² of Example 33 are treated with diazomethane according to the procedure of Examples 11(a) and 26(a) and the products are heated according to the procedure of Examples 11(b) and 26(b) and the following 17-acetyl-16-methylgon-16-enes are obtained.

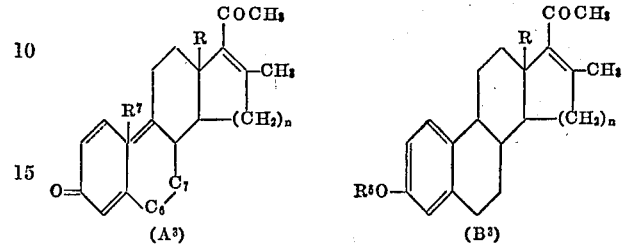

(A³)   (B³)

(C³)

FORMULA (A³)

| R | R⁷ | —C₆—C₇— | n | Unsaturation |
|---|---|---|---|---|
| CH₃CH₂ | H |  | 2 | Δ⁴ |
| CH₃CH₂ | H | Same | 1 | Δ⁴,⁹ |
| CH₃CH₂ | H |  | 1 | Δ⁴ |
| CH₃CH₂ | H | (CH₃ branch) | 1 | Δ⁴ |
| CH₃CH₂ | H | (Br branch) | 1 | Δ⁴ |
| CH₃CH₂ | H | (Cl branch) | 1 | Δ⁴ |
| CH₃CH₂CH₂ | H |  | 1 | Δ⁴ |
| (CH₃)₂CH | H | Same | 1 | Δ⁴ |
| CH₃(CH₂)₂CH₂ | H | ....do...... | 1 | Δ⁴ |
| CH₃(CH₂)₄CH₂ | H | ....do...... | 1 | Δ⁴ |

FORMULA (B³)

| R | R⁵ | n |
|---|---|---|
| CH₃CH₂ | CH₃ | 2 |
| CH₃CH₂ | H | 1 |
| CH₃CH₂CH₂ | CH₃ | 1 |
| (CH₃)₂CH | CH₃ | 1 |
| CH₃(CH₂)₂CH₂ | CH₃ | 1 |
| CH₃(CH₂)₄CH₂ | CH₃ | 1 |
| CH₃CH₂ | CH₃(CH₂)₄CH₂ | 1 |

FORMULA (C³)

| R | R⁶ | n | Unsaturation |
|---|---|---|---|
| CH₃CH₂ | CH₃CO | 2 | Δ⁵ |
| CH₃CH₂ | H | 1 | Δ⁵ |
| CH₃CH₂CH₂ | CH₃CO | 1 | Δ⁵ |
| CH₃(CH₂)₄CH₂ | CH₃CO | 1 | Δ⁵ |
| CH₃CH₂ | CH₃(CH₂)₄CH₂CO | 1 | Δ⁵ |
| CH₃CH₂ | CH₃CO | 1 | Δ³,⁵ |

The corresponding 17-acetyl-16-(lower)alkylgon-16-ones are obtained by substituting the corresponding diazo (lower)alkane for diazomethane in the procedure of Examples 11(a) and (b). There are thus prepared 17-acetyl-13,16-diethyl-3-methoxygona-1,3,5(10),16-tetraene;

17-acetyl-13-ethyl-3-methoxy-16-n-propylgona-1,3,5(10),16-tetraene;

17-acetyl-13-ethyl-16-n-hexyl-3-methoxygona-1,3,5(10),16-tetraene; and 17-acetyl-13-ethyl-16-n-hexylgona-5,16-dien-3β-ol, acetate.

EXAMPLE 35

The procedure of Example 4(a) is repeated, substituting for 13-ethyl-17a-ethynyl-3-methoxygona-1,3,5(10)-trien-17β-ol, stoichiometrical amounts of the compounds of Formulae B and C of Example 33. There are obtained:

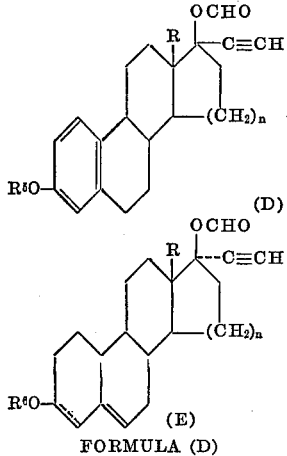

FORMULA (D)

| R | $R^5$ | n |
|---|---|---|
| $CH_3CH_2$ | $CH_3$ | 2 |
| $CH_3CH_2$ | H | 1 |
| $CH_3CH_2CH_2$ | $CH_3$ | 1 |
| $(CH_3)_2CH$ | $CH_3$ | 1 |
| $CH_3(CH_2)_2CH_2$ | $CH_3$ | 1 |
| $CH_3(CH_2)_4CH_2$ | $CH_3$ | 1 |
| $CH_3CH_2$ | $CH_3(CH_2)_4CH_2$ | 1 |

FORMULA (E)

| R | $R^6$ | n | Unsaturation |
|---|---|---|---|
| $CH_3CH_2$ | $CH_3CO$ | 2 | $\Delta^5$ |
| $CH_3CH_2$ | H | 1 | $\Delta^5$ |
| $CH_3CH_2CH_2$ | $CH_3CO$ | 1 | $\Delta^5$ |
| $CH_3(CH_2)_4CH_2$ | $CH_3CO$ | 1 | $\Delta^5$ |
| $CH_3CH_2$ | $CH_3(CH_2)_4CH_2CO$ | 1 | $\Delta^5$ |

These are treated with a mercurated cation exchange resin according to the procedure of Example 4(b) and there are obtained:

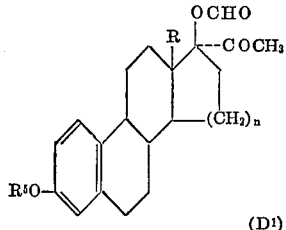

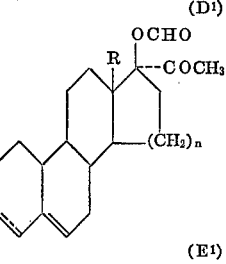

FORMULA (D¹)

| R | $R^5$ | n |
|---|---|---|
| $CH_3CH_2$ | $CH_3$ | 2 |
| $CH_3CH_2$ | H | 1 |
| $CH_3CH_2CH_2$ | $CH_3$ | 1 |
| $(CH_3)_2CH$ | $CH_3$ | 1 |
| $CH_3(CH_2)_2CH_2$ | $CH_3$ | 1 |
| $CH_3(CH_2)_4CH_2$ | $CH_3$ | 1 |
| $CH_3CH_2$ | $CH_3(CH_2)_4CH_2$ | 1 |

FORMULA (E¹)

| R | $R^6$ | n | Unsaturation |
|---|---|---|---|
| $CH_3CH_2$ | $CH_3CO$ | 2 | $\Delta^5$ |
| $CH_3CH_2$ | H | 1 | $\Delta^5$ |
| $CH_3CH_2CH_2$ | $CH_3CO$ | 1 | $\Delta^5$ |
| $CH_3(CH_2)_4CH_2$ | $CH_3CO$ | 1 | $\Delta^5$ |
| $CH_3CH_2$ | $CH_3(CH_2)_4CH_2CO$ | 1 | $\Delta^5$ |

EXAMPLE 36

The procedure of Example 2 is repeated, substituting for the 17-acetyl-13-ethyl-3-methoxygona-1,3,5(10),16-tetraene, stoichiometrical amounts of the corresponding compounds of the 17-acetylgon-16-ene series and the D-homo analogs of Formulae $A^2$, $B^2$ and $C^2$ of Example 33. There are obtained the corresponding 17β-acetylgonanes and the D-homo analogs thereof, with a single bond between $C_{16}$–$C_{17}$.

The procedure of Example 5 is repeated, substituting for the 17a-acetyl-13-ethyl - 3 - methoxygona - 1,3,5(10)-trien-17β-ol, formate and acetate stoichiometrical amounts of the corresponding compounds of the 17α-acetylgonan-17β-ol, formate or acetate series and the D-homo analogs of Formulae $D^1$ and $E^1$ of Example 35. There are obtained the corresponding 17β-acetylgonanes and D-homo analogs thereof, with a single bond between $C_{16}$–$C_{17}$.

EXAMPLE 37

The procedure of Example 3 is repeated, substituting for the 17-acetyl-13-ethyl-3-methoxygona - 1,3,5(10),16-tetraene, stoichiometrical amounts of the corresponding 17-acetyl-3 - methoxygona - 1,3,5(10),16 - tetraenes and D-homo analogs thereof of Formula $B^2$ of Example 33. The corresponding 17β-acetylgon-4-en - 3 - ones and D-homo analogs thereof are obtained.

The procedure of Example 6 is repeated, substituting for the 17α-acetyl-13-ethyl-3 - methoxygona - 1,3,5(10)-trien-17β-ol, formate and acetate stoichiometrical amounts of the corresponding 17α-acetyl-3-methoxy-gona - 1,3,5-(10)-trien-17β-ol, formates and D-homo analogs thereof of Formula $D^1$ of Example 35 and the acetates and n-hexanoates corresponding thereto. The corresponding 17β-acetylgon-4-en-3-ones and D-homo analogs thereof are obtained.

EXAMPLE 38

The procedures of Examples 9 and 10 are repeated, substituting for the methyl magnesium iodide, methylmagnesium bromide and methylmagnesium chloride. Substantially the same results are obtained.

The procedure of Example 9 is repeated, substituting for the 17-acetyl-13-ethylgona-4,16 - dien - 3 - one, stoichiometrical amounts of the corresponding 17-acetyl-gona-14,16-dien-3-ones of Formula $A^2$ of Example 33. There are obtained the corresponding 17-acetyl-5β,16α-dimethylgonanes and D-homo analogs thereof.

The procedure of Example 10, step (a), repeated substituting for the 17-acetyl-13-ethyl-3-methoxygona - 1,3,5-(10,-16-tetraene, stoichiometrical amounts of the corresponding 17-acetylgon-16-ones of Formula $B^2$ of Example 33. The corresponding 17-acetyl - 16α - methylgonanes are obtained. These are converted by the procedure of Example 10, step (b) to the corresponding 17β-acetyl-16α-methylgon-4-en-3-ones;

17β-acetyl-13-ethyl-16α-methyl-D-homagon-4-en-3-one;

17β-acetyl-16α-methyl-13-n-propylgon-4-en-3-one;

17β-acetyl-16β-methyl-13-i-propylgon-4-en-3-one;
17β-acetyl-13-n-butyl-16α-methylgon-4-en-3-one and
17β-acetyl-13-n-hexyl-16β-methylgon-4-en-3-one.

When n-hexylmagnesium bromide is substituted for methylmagnesium iodide in step (a) of Example 10, the product obtained is 17β-acetyl-13-ethyl-16α-n-hexylgon-4-en-3-one.

EXAMPLE 39

The procedure of Example 14 is repeated, substituting selected substrates of Formula B of Example 33 and there are obtained the following compounds:

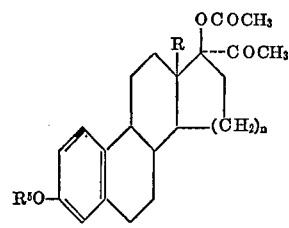

| R | R⁵ | n |
|---|---|---|
| CH₃CH₂ | CH₃ | 2 |
| CH₃CH₂ | H | 1 |
| CH₃CH₂CH₂ | CH₃ | 1 |
| (CH₃)₂CH | CH₃ | 1 |
| CH₃(CH₂)₂CH₂ | CH₃ | 1 |
| CH₃(CH₂)₄CH₂ | CH₃ | 1 |
| CH₃CH₂ | CH₃(CH₂)₄CH₂ | 1 |

EXAMPLE 40

The procedure of Example 15 is repeated substituting selected substrates of Formula B³ of Example 34 and there are obtained the following compounds:

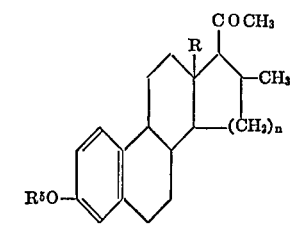

| R | R⁵ | n |
|---|---|---|
| CH₃CH₂ | CH₃ | 2 |
| CH₃CH₂ | H | 1 |
| CH₃CH₂CH₂ | CH₃ | 1 |
| (CH₃)₂CH | CH₃ | 1 |
| CH₃(CH₂)₂CH₂ | CH₃ | 1 |
| CH₃(CH₂)₄CH₂ | CH₃ | 1 |
| CH₃CH₂ | CH₃(CH₂)₄CH₂ | 1 | and, in addition, 17β-acetyl-13,16β - diethyl - 3 - methoxygona-1,3,5(10)-triene; 17β-acetyl-13-ethyl - 3 - methoxy-16β-n-propylgona-1,3,5(10)-triene; and 17β - acetyl - 13-ethyl-16β-n-hexyl-3-methoxygona-1,3,5(10)-triene.

EXAMPLE 41

The procedure of Example 16 is repeated, substituting selected substrates of Example 40 and proceeding through the corresponding 2,5(10)-diene and gen-4-en-3-en-20ξ-ol, and there are obtained:

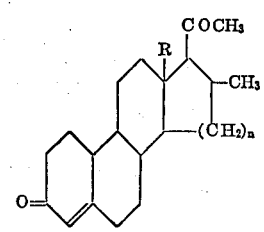

R:  n
CH₃CH₂ ———————————————— 2
CH₃CH₂CH₂ ———————————————— 1
(CH₃)₂CH ———————————————— 1
CH₃(CH₂)₂CH₂ ———————————————— 1
CH₃(CH₂)₄CH₂ ———————————————— 1 and, in addition, 17β-acetyl-13,16β-diethylgon-4-en-3-one; 17β-acetyl-13-ethyl-16β-n-propylgon - 4 - en - 3 - one; and 17β-acetyl-13-ethyl-16β-n-hexylgon-4-en-3-one.

EXAMPLE 42

The 16-(lower)alkylgona-1,3,5(10)-trienes of Example 39 are converted by the procedure of Example 10, step (b), into the corresponding 2,5(10)dienes. These are converted by the procedure of Example 17 into the following compounds:

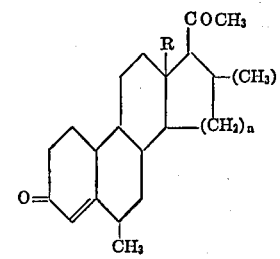

R:  n
CH₃CH₂ ———————————————— 2
CH₃CH₂CH₂ ———————————————— 1
(CH₃)₂CH ———————————————— 1
CH₃(CH₂)₂CH₂ ———————————————— 1
CH₃(CH₂)₄CH₂ ———————————————— 1 and, in addition, 17β-acetyl-13,16β-diethyl-6α-methylgon-4-en-3-one; 17β - acetyl-13ethyl-6α-methyl-16β-n-propylgon-4-en-3-one; and 17β-acetyl-13-ethyl-16β-n-hexyl-6α-methylgon-4-en-3-one.

The intermediate 6-methylene compounds in the reaction above are rearranged by the procedure of Example 18 (last part) and the following compounds are obtained:

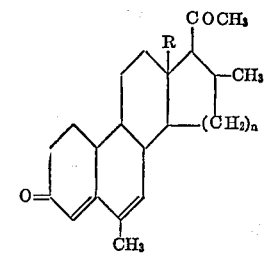

R:  n
CH₃CH₂ ———————————————— 2
CH₃CH₂CH₂ ———————————————— 1
(CH₃)₂CH ———————————————— 1
CH₃(CH₂)₂CH₂ ———————————————— 1
CH₃(CH₂)₄CH₂ ———————————————— 1 and, in addition, 17β-acetyl-13,16β-diethyl-6-methylgona-4,6-dien-3-one; 17β-acetyl-13-ethyl-6 - methyl - 16β - n-propylgona-4,6-dien-3-en; and 17β-acetyl-13-ethyl-16β-n-hexyl-6-methylgona-4,6-dien-3-one.

EXAMPLE 43

The procedure of Example 19 is repeated substituting selected substrates of Formula A of Example 32 and the following compounds are obtained:

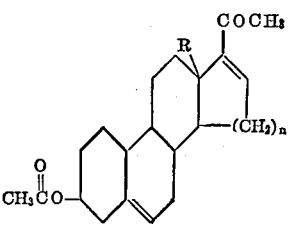

| R: | n |
|---|---|
| $CH_3CH_2$ | 2 |
| $CH_3CH_2CH_2$ | 1 |
| $CH_3(CH_2)_4CH_2$ | 1 |

The procedure of Example 19 is repeated, adding to the reaction mixture, one equivalent of n-hexanoyl chloride, based on gon-4-en-3-one. There is obtained dl-17-acetyl-13-ethylgona-5,16-dien-3β-ol n-hexanoate.

EXAMPLE 44

The procedure of Example 20 is repeated, substituting selected substrates of Formula $B^2$ of Example 33 and the following are obtained:

| R | $R^5$ | n |
|---|---|---|
| $CH_3CH_2$ | $CH_3$ | 2 |
| $CH_3CH_2$ | H | 1 |
| $CH_3CH_2CH_2$ | $CH_3$ | 1 |
| $(CH_3)_2CH$ | $CH_3$ | 1 |
| $CH_3(CH_2)_2CH_2$ | $CH_3$ | 1 |
| $CH_3(CH_2)_4CH_2$ | $CH_3$ | 1 |
| $CH_3CH_2$ | $CH_3(CH_2)_4CH_2$ | 1 | n-Hexylmagnesium bromide is substituted for methyl magnesium iodide in the procedure of Example 20 and there is obtained dl-17β-acetyl-13-ethyl-16α-n-hexyl-3-methoxygona-1,3,5(10)-trien-17α-ol.

EXAMPLE 45

The procedure of Examples 21 and 22 are repeated substituting selected substrates of Example 40 and 17-(1-acetoxyethylidene)-derivatives thereof and the following are obtained:

| R | $R^5$ | n |
|---|---|---|
| $CH_3CH_2$ | $CH_3$ | 2 |
| $CH_3CH_2$ | H | 1 |
| $CH_3CH_2CH_2$ | $CH_3$ | 1 |
| $(CH_3)_2CH$ | $CH_3$ | 1 |
| $CH_3(CH_2)_2CH_2$ | $CH_3$ | 1 |
| $CH_3(CH_2)_4CH_2$ | $CH_3$ | 1 |
| $CH_3CH_2$ | $CH_3(CH_2)_4CH_2$ | 1 | and, in addition 17β-acetyl-13,16β-diethyl-3-methoxygona-1,3,5(10) - trien - 17α - ol; 17 - β - acetyl - 13 - ethyl - 3-methoxy - 16β - n - propylgona - 1,3,5(10) - trien - 17α-ol; and 17β-acetyl-13-ethyl-16β-n-hexyl-3-methoxygona-1,3,5(10)-trien-17α-ol.

EXAMPLE 46

The procedure of Example 23 is repeated substituting selected substrates from Example 44 and the following are obtained:

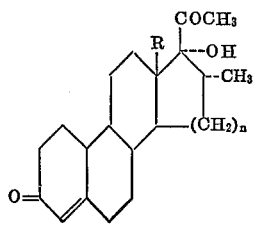

| R: | n |
|---|---|
| $CH_3CH_2$ | 2 |
| $CH_3CH_2CH_2$ | 1 |
| $(CH_3)_2CH$ | 1 |
| $CH_3(CH_2)_2CH_2$ | 1 |
| $CH_3(CH_2)_4CH_2$ | 1 | and, in addition, dl-17β-acetyl-13-ethyl-16α-n-hexylgon-4-en-3-on-17α-ol.

EXAMPLE 47

The procedure of Example 24 is repeated substituting selected substrates of Example 45 and there are obtained:

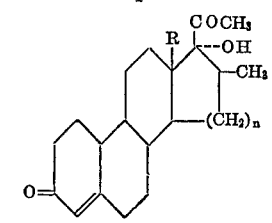

| R: | n |
|---|---|
| $CH_3CH_2$ | 2 |
| $CH_3CH_2CH_2$ | 1 |
| $(CH_3)_2CH$ | 1 |
| $CH_3(CH_2)_2CH_2$ | 1 |
| $CH_3(CH_2)_4CH_2$ | 1 | and, in addition, 17β-acetyl-13,16β-diethylgon-3-en-3-en-17α-ol; 17β - acetyl - 13 - ethyl-16β-n-propylgon-4-en-3-on-17α-ol; and 17β - acetyl - 13 - ethyl-16β-n-hexylgon-4-en-3-en-17α-ol.

EXAMPLE 48

The procedure of Example 25 is repeated substituting selected substrates from Examples 46 and 47 and there are obtained:

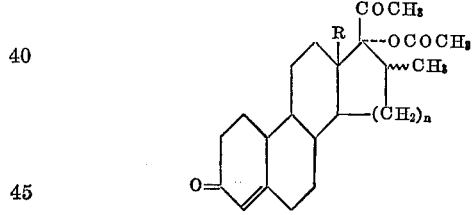

| R | n | 16-epimer |
|---|---|---|
| $CH_3CH_2$ | 2 | α |
| $CH_3CH_2$ | 2 | β |
| $CH_3CH_2CH_2$ | 1 | α |
| $CH_3CH_2CH_2$ | 1 | β |
| $(CH_3)_2CH$ | 1 | α |
| $(CH_3)_2CH$ | 1 | β |
| $CH_3(CH_2)_2CH_2$ | 1 | α |
| $CH_3(CH_2)_2CH_2$ | 1 | β |
| $CH_3(CH_2)_4CH_2$ | 1 | α |
| $CH_3(CH_2)_4CH_2$ | 1 | β | and, in addition dl-17β-acetyl-13-ethyl-16β-n-hexylgon-4-en - 3 - on - 17α-ol, acetate; 17β-acetyl-13,16β-diethylgon-4-en-3-on-17α-ol, acetate; 17β-acetyl-13-ethyl-16β-n-propylgon-4-en-3-on-17α-ol, acetate; and 17β-acetyl-13-ethyl-16β-n-hexylgon--4-en-3-on-17α-ol, acetate.

EXAMPLE 49

The procedure of Example 26 is repeated substituting selected substrates of Example 43 and the following are obtained:

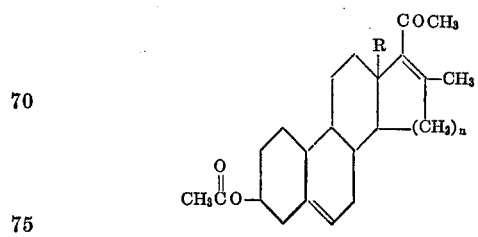

R:  n
CH₃CH₂ -------------------------------- 2
CH₃CH₂CH₂ ----------------------------- 1
CH₃(CH₂)₄CH₂ -------------------------- 1 and, in addition, *dl*-17-acetyl-13-ethyl-16-methylgona-5,16-dien-3β-ol, n-hexanoate.

EXAMPLE 50

The procedure of Example 27 is repeated, substituting selected substrates of Example 49 and there are obtained:

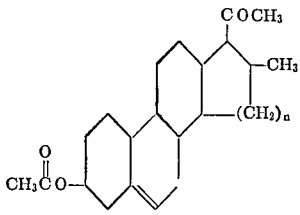

R:  n
CH₃CH₂ -------------------------------- 2
CH₃CH₂CH₂ ----------------------------- 1
CH₃(CH₂)₄CH₂ -------------------------- 1 and, in addition, *dl*-17β-acetyl-13-ethyl-16β-methylgon-5-en-3β-ol, n-hexanoate.

EXAMPLE 51

The procedure of Example 28 is repeated substituting selected substrates prepared from the compounds of Example 49 by the procedure of Example 50 and selected, compounds prepared from those of Example 34 of Formula C³ by the procedure of Example 28, step (b), and there are obtained:

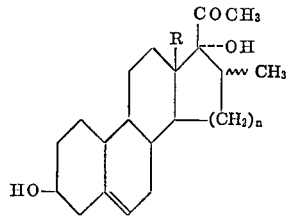

| R | n | 16-epimer |
|---|---|---|
| CH₃CH₂ | 2 | α |
| CH₃CH₂ | 2 | β |
| CH₃CH₂CH₂ | 1 | α |
| CH₃CH₂CH₂ | 1 | β |
| (CH₃)₂CH | 1 | α |
| (CH₃)₂CH | 1 | β |
| CH₃(CH₂)₂CH₂ | 1 | α |
| CH₃(CH₂)₂CH₂ | 1 | β |
| CH₃(CH₂)₄CH₂ | 1 | α |
| CH₃(CH₂)₄CH₂ | 1 | β |

EXAMPLE 52

The procedure of Example 29 is repeated substituting selected substrates of Example 51 and the following compounds are obtained:

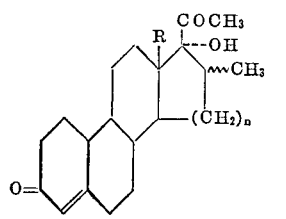

| R | n | 16-epimer |
|---|---|---|
| CH₃CH₂ | 2 | α |
| CH₃CH₂ | 2 | β |
| CH₃CH₂CH₂ | 1 | α |
| CH₃CH₂CH₂ | 1 | β |
| (CH₃)₂CH | 1 | α |
| (CH₃)₂CH | 1 | β |
| CH₃(CH₂)₂CH₂ | 1 | α |
| CH₃(CH₂)₂CH₂ | 1 | β |
| CH₃(CH₂)₄CH₂ | 1 | α |
| CH₃(CH₂)₄CH₂ | 1 | β |

EXAMPLE 53

The procedure of Example 30 is repeated substituting selected substrates of Example 52 and there are obtained the following compounds:

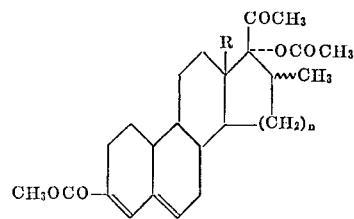

| R | n | 16-epimer |
|---|---|---|
| CH₃CH₂ | 2 | α |
| CH₃CH₂ | 2 | β |
| CH₃CH₂CH₂ | 1 | α |
| CH₃CH₂CH₂ | 1 | β |
| (CH₃)₂CH | 1 | α |
| (CH₃)₂CH | 1 | β |
| CH₃(CH₂)₄CH₂ | 1 | α |
| CH₃(CH₂)₄CH₂ | 1 | β |
| CH₃(CH₂)₆CH₂ | 1 | α |
| CH₃(CH₂)₆CH₂ | 1 | β |

EXAMPLE 54

The procedure of Example 31 is repeated substituting selected substrates of Example 53 and there are obtained:

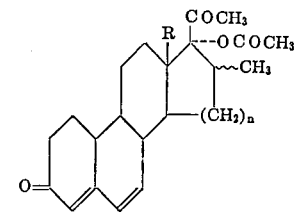

| R | n | 16-epimer | R | n | 16-epimer |
|---|---|---|---|---|---|
| CH₃CH₂ | 2 | α | CH₃CH₂ | 2 | β |
| CH₃CH₂CH₂ | 1 | α | CH₃CH₂CH₂ | 1 | β |
| (CH₃)₂CH | 1 | α | (CH₃)₂CH | 1 | β |
| CH₃(CH₂)₂CH₂ | 1 | α | CH₃(CH₂)₂CH₂ | 1 | β |
| CH₃(CH₂)₄CH₂ | 1 | α | CH₃(CH₂)₄CH₂ | 1 | β |

EXAMPLE 55

The procedure of Example 33 is repeated substituting selected substrates of Example 54 and as a final step, hydrolyzing the 17α-acetoxy group with methanolic potassium hydroxide to provide the 17α-ol. There are obtained the following compounds:

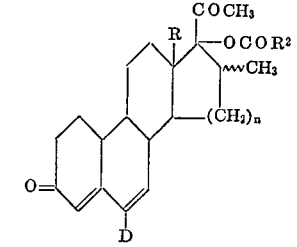

| R | R₂ | n | D | 16-epimer |
|---|---|---|---|---|
| CH₃CH₂ | CH₃ | 2 | Cl | α |
| CH₃CH₂ | CH₃ | 2 | Cl | β |
| CH₃CH₂ | CH₃ | 2 | Br | α |
| CH₃CH₂ | CH₃ | 2 | Br | β |
| CH₃CH₂ | CH₃ | 2 | F | α |
| CH₃CH₂ | CH₃ | 2 | F | β |
| CH₃CH₂ | H | 1 | Cl | α |
| CH₃CH₂ | H | 1 | Cl | β |
| CH₃CH₂ | H | 1 | Br | α |
| CH₃CH₂ | H | 1 | Br | β |
| CH₃CH₂ | H | 1 | F | α |
| CH₃CH₂ | H | 1 | F | β |
| CH₃(CH₂)₄CH₂ | CH₃ | 1 | Cl | α |
| CH₃(CH₂)₄CH₂ | CH₃ | 1 | Cl | β |

EXAMPLE 56

The procedure of Example 31 is repeated, evaporating the solution to dryness and omitting the treatment with calcium carbonate. The products are dl-17β-acetyl-17α-acetoxy-6α-bromo - 13 - ethyl-16α-methylgon-4-en-3-one and dl-17β-acetyl-17α-acetoxy - 6α - bromo-13-ethyl-16β-methylgon-4-en-3-one. N-chloroacetamide is substituted for NBA and there are obtained, respectively, dl-17β-acetyl-17α-acetoxy-6α-chloro-13-ethyl - 16α - methylgon-4-en-3-one and dl-17β-acetyl-17α-acetoxy-6α-chloro-13-ethyl-16β-methylgon-4-en-3-one.

EXAMPLE 57 dl-17-acetyl-13-ethylgona-5,16-dien-3β-ol

Reflux a mixture of dl-13-ethyl-17-ethynylgona-5,16-dien-3β-ol, acetate (15.0 g.), mercurated Dowex 50W–X8 resin (300 ml.), water (60 ml.) and ethanol (1 l.) for 6 hours. Filter the solution hot through filter aid, wash the filter cake with methylene chloride then evaporate the combined filtrates in vacuo to get a mixture of the title product and the corresponding acetate. Treat the residue in methanol (200 ml.) with a solution of potassium hydroxide (8.0 g.) in water (25 ml.), boil gently on the steam bath for 10 minutes then cool and stir at about 23° C. for 1 hour. Add water to fully precipitate the title product. Further purify a sample by treatment with decolorizing charcoal in hot methylene chloride, filter (filter aid), then replace the solvent with benzene by boiling on the steam bath. Let stand to precipitate the pure title product, M.P. 213–215° C.;

$\lambda_{max.}^{KBr}$ 2.93 and 6.08μ; $\lambda_{max.}^{EtOH}$ 242 mμ (ε 8,170)

*Analysis.*—Calcd. for $C_{21}H_{30}O_2$ (percent): C, 80.21; H, 9.62. Found (percent): C, 80.52; H, 9.66.

EXAMPLE 58 dl-17β-acetyl-13-ethyl-16α-methylgona-5-en-3β,17α-diol

To ice-cooled dry tetrahydrofuran (75 ml.) add 3 M ethereal methylmagnesium bromide (15 ml.), stir then add cuprous chloride (600 mg.) and stir for 5 minutes. To the cooled, stirred mixture add a solution of dl-17-acetyl-13-ethylgona-5,16-dien-3β-ol (3.57 g.) in dry tetrahydrofuran (75 ml.) dropwise over a period of 15 minutes. Stir for 15 minutes, remove the ice-bath and stir a further 45 minutes at room temperature. Cool the solution again with an ice-bath then with rapid stirring bubble oxygen gas through the reaction for 3 hours. Pour the mixture into 105 ammonium chloride solution (250 ml.) and extract the mixture with ether-ethyl acetate. Wash, dry and evaporate the extract in vacuo. Dissolve the resulting oil in benzene, pass the solution through a short column of fluorosilicate. Wash the column with chloroform, remove the solvent in vacuo and triturate the resulting oil with ether to get the title product, M.P. 204–208° C.;

$\lambda_{max.}^{KBr}$ 2.96 and 5.92μ

EXAMPLE 59 dl-17β-acetyl-13-ethyl-16α-methyl-3-methoxygona-1,3,5(10)-trien-17α-ol

Substitute for the substrate in Example 58, dl-17-acetyl-13-ethyl-3-methoxygona-1,3,5(10),16-tetraene to obtain the title product.

We claim:

1. 17α-acetyl-13-ethyl-3-methoxygona-1,3,5(10)-trien-17β-ol, formate.
2. 17-acetyl-13-ethylgona-4,16-dien-3-one.
3. 17-acetyl-13-ethyl-3-methoxy-16-methylgona - 1,3,5(10),16-tetraene.
4. 17-acetyl-13-ethylgona-5,16-dien-3β-ol, acetate or the 3β-ol thereof.
5. 17-acetyl-13-ethyl-16-methylgona-5,16-dien - 3β - ol, acetate or the 3β-ol thereof.
6. 17β-acetyl-13-ethyl-16β-methylgona-5-en-3β-ol, acetate.
7. 17β-acetyl-13-ethyl-16α-methylgona-5-ene-3β,17α-diol.
8. 17β-acetyl-13-ethyl-16α-methylgona-3,5-dien - 3,17α-diol, diacetate.
9. 13-ethyl-17β-(1-hydroxyethyl)-16α-methyl-3 - methoxygona-2,5(10)-dien-17α-ol.
10. A process for the preparation of a compound of the 17-acetylgon-16-ene series, which comprises heating a solution of the corresponding 17-ethynylgon-16-ene in the presence of a heavy metal ion catalyst until hydration of the 17-ethynyl group is substantially complete, and recovering said acetyl compound.
11. A process as defined in claim 10 wherein said catalyst is a mercurated cation exchange resin.
12. A process as defined in claim 10 in cluding the step of preparing said 17-ethynylgon-16-ene by dehydrating a corresponding 17α-ethynylgonan-17β-ol.
13. A process as defined in claim 12 wherein the dehydration is accomplished by treatment with phosphorus oxychloride in the presence of pyridine.
14. A process as defined in claim 10 including the steps of:
    (a) reacting said 17-acetylgon-16-ene with a diazoalkane until formation of the corresponding 17-acetyl-16α,17α-alkyleneazogonane is substantially complete; and
    (b) heating the product of step (a) until rearrangement into the corresponding 17-acetyl-16-alkylgon-16-ene is substantially complete.
15. A process as defined in claim 14 wherein the diazoalkane in step (a) is diazomethane.
16. A process as defined in claim 14 wherein
    (a) 17-acetyl-13-ethyl-3-methoxygona - 1,3,5(10),16-tetraene is reacted with diazomethane to provide 17β-acetyl-13-ethyl-3-methoxy - 16α,17α - methyleneazogona-1,3,5(10)triene; and
    (b) the product of step (a) is heated to provide 17-acetyl-13-ethyl-3-methoxy - 16 - methylgona - 1,3,5 (10),16-tetraene.
17. A process as defined in claim 14 including the step of catalytically hydrogenating said 17-acetyl-16-alkylgon-16-ene until formation of the corresponding 17-acetyl-16-alkylgonane is substantially complete.
18. A process as defined in claim 17 wherein 17-acetyl-13-ethyl-3-methoxy-16-methylgona-1,3,5(10), 16-tetraene is catalytically hydrogenated to provide 17β-acetyl-13-ethyl-3-methoxy-16β-methylgona-1,3,5(10)-triene.
19. A process as defined in claim 17 including the steps of
    (a) reducing a 17β-acetyl-16-alkylgona-1,3,5(10)-triene until formation of the corresponding 17β-(α-hydroxyethyl)gona-2,5(10)-diene is substantially complete;
    (b) hydrolyzing said gona-2,5(10)diene from step (a) with acid until formation of the corresponding 17β-(α-hydroxyethyl)gon-4-en-3-one is substantially complete; and
    (c) oxidizing said gon-4-en-3-one from step (b) until formation of a 17β-acetyl-16-alkylgon-4-en-3-one is substantially complete.
20. A process as defined in claim 19 wherein 17β-acetyl-13-ethyl-16β-methylgon-4-en-3-one is prepared by:
    (a) reducing 17β-acetyl-13-ethyl-3-methoxy-16β-methylgona-1,3,5(10)triene to form 17β-(α-hydroxyethyl) - 13 - ethyl - 3 - methoxy - 16β - methylgona-2,5(10)-diene;
    (b) treating the product of step (a) with acid to form 17β - (α - hydroxyethyl) - 13 - ethyl - 16β - methylgon-4-en-3-one; and (c) oxidizing the product of step (b) to provide 17β-acetyl-13-ethyl-16β-methylgon-4-en-3-one.

21. A process a defined in claim 10 including the steps of reacting said 17-acetylgon-16-ene with a reagent of the formula (lower)alkyl·Mg·hal wherein hal is bromo, iodo or chloro until formation of the corresponding 17-acetyl-16α-(lower)alkylgonane enolate is substantially complete, reacting said enolate with acid and recovering said gonane.

22. A process as defined in claim 21 wherein 17-acetyl-13-ethylgona-4,16-dien-3-one is reacted with excess methyl magnesium iodide then with acid to provide 17β-acetyl-13-ethyl-5β,16α-dimethylgon-3-one.

23. A process a defined in claim 21 wherein 17-acetyl-13-ethyl-3-methoxygona-1,3,5(10),16-tetraene is reacted with methyl magnesium iodide to provide 17β-acetyl-13-ethyl-16α-methyl-3-methoxygona-1,3,5(10)-triene.

24. A process as defined in claim 21 including the (a) steps of reducing a 17-acetyl-3-alkoxy-16α-(lower)alkylgon-1,3,5(10)-triene until formation of the corresponding 17β - (α - hydroxyethyl) - 3 - alkoxy - 16α - (lower)alkylgona-2,5(10)-diene is substantially complete;
(b) hydrolyzing the product from step (a) with acid until formation of the corresponding 17β-(α-hydroxyethyl)-16α-(lower)alkylgon-4-en-3-one is substantially complete;
(c) oxidizing the product from step (b) until formation of a 17β-acetyl-16α-(lower)alkylgon-4-en-3-one is substantially complete.

25. A process as defined in claim 24 wherein 17β-acetyl-13-ethyl-16α-methylgon-4-en-3-one is prepared by:
(a) reducing 17β-acetyl-13-ethyl-16α-methyl-3-methoxygona-1,3,5(10)-triene to form 17β-(α-hydroxyethyl) - 13 - ethyl - 3 - methoxy - 16α - methylgona-2,5(10)-diene;
(b) treating the product of step (a) with an acid to provide 17β-(α-hydroxyethyl)-13-ethyl-16α-methylgon-4-en-3-one; and
(c) oxidizing the product of step (b) to provide said 17β-acetyl-13-ethyl-16α-methylgon-4-en-3-one.

26. A process as defined in claim 21 including the steps of
(a) treating first with an epoxidizing agent and then with a base of 17-(1-(lower)alkanoyloxyethylidene)-3-alkoxy-16α-(lower)alkylgona-1,3,5(10)-triene until formation of the corresponding 17β-acetyl-3-alkoxy-16α-(lower)alkylgona-1,3,5(10)-trien-17β-ol is substantially complete;
(b) reducing the product from step (a) until formation of a 17β-(1-hydroxyethyl)-3-alkoxy-16α-(lower)alkylgona-1,3,5(10)-trien-17α-ol is substantially complete;
(c) reducing the product of step (b) under Birch conditions until formation of the corresponding 17β-(1-hydroxyethyl) - 3 - alkoxy - 16α - (lower)alkylgona 2,5(10)-dien-17α-ol is substantially complete;
(d) hydrolyzing the product from step (c) with acid until formation of the corresponding 17β-(1-hydroxyethyl)-17α-hydroxy-16α-(lower)alkylgon-4-en-one is substantially complete; and
(e) oxidizing the product of step (d) until formation of a 17β-acetyl-17α-hydroxy-16α-(lower)alkylgon-4-en-3-one is substantially complete.

27. A process as defined in claim 26 wherein 17β-acetyl-13-ethyl-16α-methylgon-4-en-3-on-17α-ol is prepared by:
(a) epoxidizing and hydrolyzing 13-ethyl-17-(1-acetoxyethylidene) - 16α - methyl - 3 - methoxygona-1,3,5(10)-triene to form 17β-acetyl-13-ethyl-16α-methyl-3-methoxygona-1,3,5(10)-trien-17α-ol;
(b) treating the product of step (a) with a reducing agent to form 13-ethyl-17β-(1-hydroxyethyl)-16α-methyl-3-methoxygona-1,3,5(10)-trien-17α-ol;

(c) reducing the product from step (b) to form 13-ethyl - 17β - (1 - hydroxyethyl) - 16α - methyl - 3-methoxygona-2,5(10)-dien-17α-ol;
(d) hydrolyzing the product from step (c) with an acid to form 13 - ethyl - 17β - (1-hydroxyethyl)-17-α-hydroxy-16α-methylgon-4-en-3-one; and
(e) oxidizing the product of step (d) to form 17β-acetyl - 13 - ethyl - 17α - hydroxy - 16α - methylgon - 4-en-3-one.

28. A process as defined in claim 26 including the steps of
(a) enolalkanoylating the product until formation of the corresponding 17β-acetyl-16α-(lower)alkylgona-3,5-diene-3,17α-diol, di(lower)alkanoate is substantially complete; and
(b) hydrolyzing the product of step (a) until formation of the corresponding 17β-acetyl-17α-hydroxy-16α-(lower)alkylgon-4-en-3-one, (lower)alkanoate is substantially complete.

29. A process as defined in claim 28 wherein 17β-acetyl-13-ethyl-17α-hydroxy-16α-methylgon-4-en-3-one, acetate, is prepared by:
(a) enolacetylating 17β - acetyl-13-ethyl-17α-hydroxy-16α-methylgon-4-en-3-one to form 17β-acetyl-13-ethyl-16α-methylgona-3,5-diene, 3,17α-diol, diacetate; and
(b) hydrolyzing the product of step (a) to form 17β-acetyl - 13 - ethyl-17α-hydroxy-16α-methylgon-4-en-3-one, acetate.

30. A process as defined in claim 12 wherein 13-ethyl-17α - ethynyl - 3 - methoxy - 16α - methylgona-1,3,5(10)-trien-17β-ol is dehydrated to produce 13-ethyl-17-ethynyl-3-methoxy-16-methylgona-1,3,5(10),16-tetraene; and including the steps of heating said ethynyl-tetraene in solution with water and a catalyst to produce 17-acetyl-13-ethyl - 3 - methoxy-16-methylgona-1,3,5(10),16-tetraene; and catalytically hydrogenating said acetyltetraene to form 17β - acetyl - 13 - ethyl-3-methoxy-16β-methylgona-1,3,5(10)-triene.

31. A process for the preparation of a compound of the 17-acetylgona-17β-ol, formate or alkanoate, series which comprises heating the corresponding 17α-ethynylgona-17β-ol, formate or alkanoate in the presence of water and a heavy metal ion catalyst until hydration of the 17α-ethynyl group is substantially complete, and recovering said compound.

32. A process as defined in claim 31 wherein said catalyst is a mercurated cation exchange resin.

33. A process as defined in claim 31 wherein said catalyst is silver nitrate.

34. A process as defined in claim 31 including the step of preparing said 17α-ethynylgonan-17β-ol, formate by reacting the corresponding 17α-ethynylgonan-17β-ol with dimethylformamide in the presence of phosphorous oxychloride.

35. A process for the preparation of a compound of the 17β-acetylgon-4-en-3-one series which comprises:
(a)(i) reducing the corresponding 17-acetyl-3-alkoxygona-1,3,5(10),16-tetraene with lithium in liquid ammonia and t-butanol; or (ii) cleaving and reducing the corresponding 17α-acetyl - 3 - alkoxygona-1,3,5 (10)-trien-17β-ol, formate or alkanoate, with lithium in liquid ammonia and t-butanol, until formation of the corresponding 17β - (α - hydroxyethyl)-3-alkoxygona-2,5(10)-diene is substantially complete;
(b) hydrolyzing said gona-2,5(10)-diene from step (a) with acid until formation of the corresopnding 17β-(α-hydroxyethyl)gon-4-en-3-one is substantially complete; and
(c) oxidizing said gon-4-en-3-one from step (b) with chromic acid until formation of said 17β-acetylgon-4-en-3-one is substantially complete.

36. A process as defined in claim 35 wherein step (b) is carried out in methanol and hydrochloric acid; and the oxidation in step (c) is carried out with 8 N chromic acid in anhydrous acetone.

37. A process as defined in claim 35 wherein 17β-acetyl-13-ethylgon-4-en-3-one is prepared by
   (a)(i) reducing 17-acetyl-13-ethyl-3-methoxygon-1,3,5(10),16-tetraene or (ii) cleaving and reducing 17α-acetyl - 13 - ethyl - 3 - methoxygona-1,3,5(10)-triene-17β-ol, formate or acetate to form 17β-(α-hydroxyethyl)-13-ethyl-3-methoxygona-2,5(10)-diene;
   (b) hydrolyzing the product of step (a) to provide 17β-(α-hydroxyethyl)-13-ethylgon-4-en-3-one; and
   (c) oxidizing the product of step (b) to provide said 17β-acetyl-13-ethylgon-4-en-3-one.

References Cited
UNITED STATES PATENTS

| | | | |
|---|---|---|---|
| 3,053,858 | 9/1962 | Mills | 260—397.3 |
| 3,212,969 | 10/1965 | Bowers | 167—58 |
| 3,461,142 | 8/1969 | Kincl | 260—397.4 |
| 3,485,828 | 12/1969 | Zderic | 260—239.55 |
| 3,488,364 | 1/1970 | Teller et al. | 260—397.4 |

HENRY A. FRENCH, Primary Examiner

U.S. Cl. X.R.

260—239.55 R, 239.55 C, 397.5, 999